United States Patent
Shrivastava et al.

(10) Patent No.: US 12,159,110 B2
(45) Date of Patent: Dec. 3, 2024

(54) DETERMINING CONCEPT RELATIONSHIPS IN DOCUMENT COLLECTIONS UTILIZING A SPARSE GRAPH RECOVERY MACHINE-LEARNING MODEL

(71) Applicant: Microsoft Technology Licensing, LLC, Redmond, WA (US)

(72) Inventors: Harsh Shrivastava, Redmond, WA (US); Maurice Diesendruck, Bellevue, WA (US); Robin Abraham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 17/833,142

(22) Filed: Jun. 6, 2022

(65) Prior Publication Data

US 2023/0394239 A1    Dec. 7, 2023

(51) Int. Cl.
*G06F 40/295* (2020.01)

(52) U.S. Cl.
CPC .................. *G06F 40/295* (2020.01)

(58) Field of Classification Search
CPC .............. G06F 16/243; G06F 16/245; G06F 16/24569; G06F 16/26; G06F 16/338; G06F 16/951; G06F 40/237; G06F 40/242; G06F 40/295; G06F 40/30; G06F 3/0481; G06F 16/2457; G06F 16/285; G06F 16/35; G06F 16/353; G06F 16/906; G06F 16/9024; G06F 21/552; G06N 3/0475; G06N 5/04; G06N 20/10; G06N 5/02; G06N 7/01; G06T 11/206; G06Q 30/02; G06Q 30/0203; G06V 10/82
See application file for complete search history.

(56) References Cited

U.S. PATENT DOCUMENTS

| | | | |
|---|---|---|---|
| 9,645,999 B1* | 5/2017 | Ciulla | G06F 16/35 |
| 9,710,544 B1* | 7/2017 | Smith | G06F 16/36 |
| 9,715,495 B1* | 7/2017 | Tacchi | G06F 40/30 |
| 11,620,320 B1* | 4/2023 | Shukla | G06F 40/30 707/692 |
| 2008/0033932 A1* | 2/2008 | DeLong | G06F 16/951 707/999.005 |
| 2014/0229163 A1* | 8/2014 | Gliozzo | G06F 40/30 704/9 |
| 2016/0012119 A1* | 1/2016 | Franceschini | G06F 16/338 707/722 |
| 2016/0299975 A1* | 10/2016 | Acar | G06F 16/24569 |

(Continued)

*Primary Examiner* — Gerald Gauthier
(74) *Attorney, Agent, or Firm* — Ray Quinney & Nebeker; Christopher Hallstrom

(57) ABSTRACT

The present disclosure relates to systems, methods, and computer-readable media for utilizing a concept graphing system to determine and provide relationships between concepts within document collections or corpora. For example, the concept graphing system can generate and utilize machine-learning models, such as a sparse graph recovery machine-learning model, to identify less-obvious correlations between concepts, including positive and negative concept connections, as well as provide these connections within a visual concept graph. Additionally, the concept graphing system can provide a visual concept graph that determines and displays concept correlations based on the input of a single concept, multiple concepts, or no concepts.

20 Claims, 13 Drawing Sheets

(56) References Cited

U.S. PATENT DOCUMENTS

| | | | |
|---|---|---|---|
| 2017/0004129 A1* | 1/2017 | Shalaby | G06F 40/242 |
| 2017/0083507 A1* | 3/2017 | Ho | G06Q 30/0203 |
| 2017/0132288 A1* | 5/2017 | Ho | G06F 16/243 |
| 2017/0286835 A1* | 10/2017 | Ho | G06N 20/10 |
| 2018/0217980 A1* | 8/2018 | Baron-Palucka | G06F 40/30 |
| 2019/0163835 A1* | 5/2019 | Scheideler | G06F 16/9024 |
| 2021/0133390 A1* | 5/2021 | Tagawa | G06T 11/206 |
| 2021/0182328 A1* | 6/2021 | Rollings | G06F 40/30 |
| 2021/0182495 A1* | 6/2021 | Truong | G06F 16/2457 |
| 2021/0319054 A1* | 10/2021 | Glass | G06N 3/08 |
| 2021/0390464 A1* | 12/2021 | Zhang | G06N 5/04 |
| 2022/0108188 A1* | 4/2022 | Wu | G06N 5/04 |
| 2022/0156468 A1* | 5/2022 | Kim | G06F 40/237 |
| 2022/0179906 A1* | 6/2022 | Desai | G06F 16/906 |
| 2022/0262268 A1* | 8/2022 | Mohanty | G06F 16/285 |
| 2022/0358145 A1* | 11/2022 | Chen | G06F 16/245 |
| 2022/0382856 A1* | 12/2022 | Yang | G06F 21/552 |
| 2023/0061773 A1* | 3/2023 | Patil | G06F 40/295 |
| 2023/0073220 A1* | 3/2023 | Del Villar | G06F 16/26 |
| 2023/0116515 A1* | 4/2023 | Kanagovi | G06F 16/353 |
| | | | 704/9 |
| 2023/0222150 A1* | 7/2023 | Sun | G06V 10/82 |
| | | | 707/740 |
| 2023/0320642 A1* | 10/2023 | Lin | G06F 40/30 |
| 2023/0342629 A1* | 10/2023 | Panda | G06N 5/02 |
| 2023/0342693 A1* | 10/2023 | Hood | G06F 40/211 |
| 2023/0359825 A1* | 11/2023 | Ramsl | G06N 3/0475 |
| 2023/0394239 A1* | 12/2023 | Shrivastava | G06F 40/30 |
| 2024/0005181 A1* | 1/2024 | Chajewska | G06N 7/01 |

\* cited by examiner

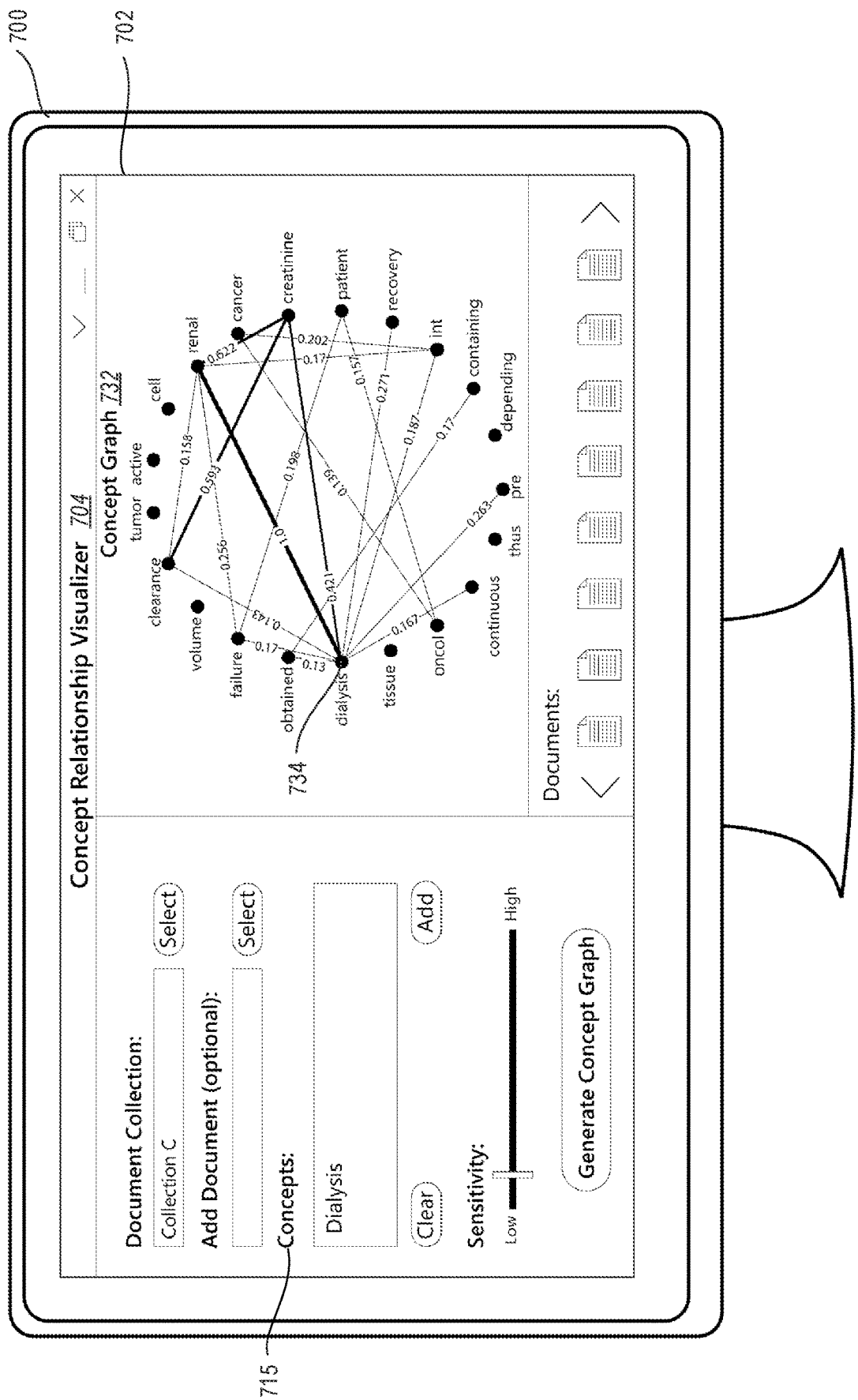

DETERMINING CONCEPT RELATIONSHIPS IN DOCUMENT COLLECTIONS UTILIZING A SPARSE GRAPH RECOVERY MACHINE-LEARNING MODEL

BACKGROUND

Recent years have seen significant advancements in electronic communication using various forms of digital content. Examples of digital content include electronic documents such as text files, electronic messages (e.g., email, texts, direct messages, broadcast messages), posts (e.g., social media posts, tweets, blogs, discussion boards), program files, or other network communications. Indeed, advances in computer technology have allowed users to easily generate, duplicate, access, share, and otherwise communicate digital content. For example, related electronic documents are often gathered into collections for use across a variety of important fields, such as medicine, political discourse, public, media, research, and academia.

Despite these and other advances, existing computing systems face several technical shortcomings that result in inaccurate, inflexible, and inefficient operations, particularly in the area of managing conceptual connections across electronic document collections. To illustrate, as collections of electronic documents (or simply documents) grow, the opportunity for connections between concepts also increases. However, existing computing systems are limited in their ability to discover non-obvious connections within a collection of documents. Indeed, while some existing computing systems provide common conceptual connections within a document collection, these existing computing systems inaccurately fail to provide less-common connections or show when concepts are mutually exclusive within a document collection.

In particular, existing computing systems commonly struggle to accurately identify and extract connections between concepts in a document collection. For instance, many existing computing systems employ inefficient high-level natural language processing approaches to extract ideas from documents. Indeed, many existing computing systems employ machine-learning algorithms in connection with natural language processing to mine documents for concepts. However, these conventional methods present several disadvantages, such as requiring large amounts of computing resources as well as missing non-obvious correlations, including negative conceptual correlations.

Further, many existing computing systems are computationally expensive, rigid, and require significant human effort. For example, many existing computing systems rely on human reviewers to manually read and classify documents by assigning one or more predetermined topics (e.g., codes, labels, tags, categories, etc.) to each document. Additionally, these existing computing systems provide poor user interfaces for accessing, assigning, and reviewing documents. Indeed, several existing computing systems require numerous navigational steps for a user to input and connect concepts between documents in a collection.

These and other problems result in significant inaccuracies, inflexibilities, and inefficiencies of computing systems with respect to managing conceptual relationships in document collections.

BRIEF DESCRIPTION OF THE DRAWINGS

The detailed description provides one or more implementations with additional specificity and detail through the use of the accompanying drawings, as briefly described below.

FIGS. 7A-7C illustrates examples of providing a visual concept graph for a document collection via an interactive interface in accordance with one or more implementations.

DETAILED DESCRIPTION

Figure 1A:
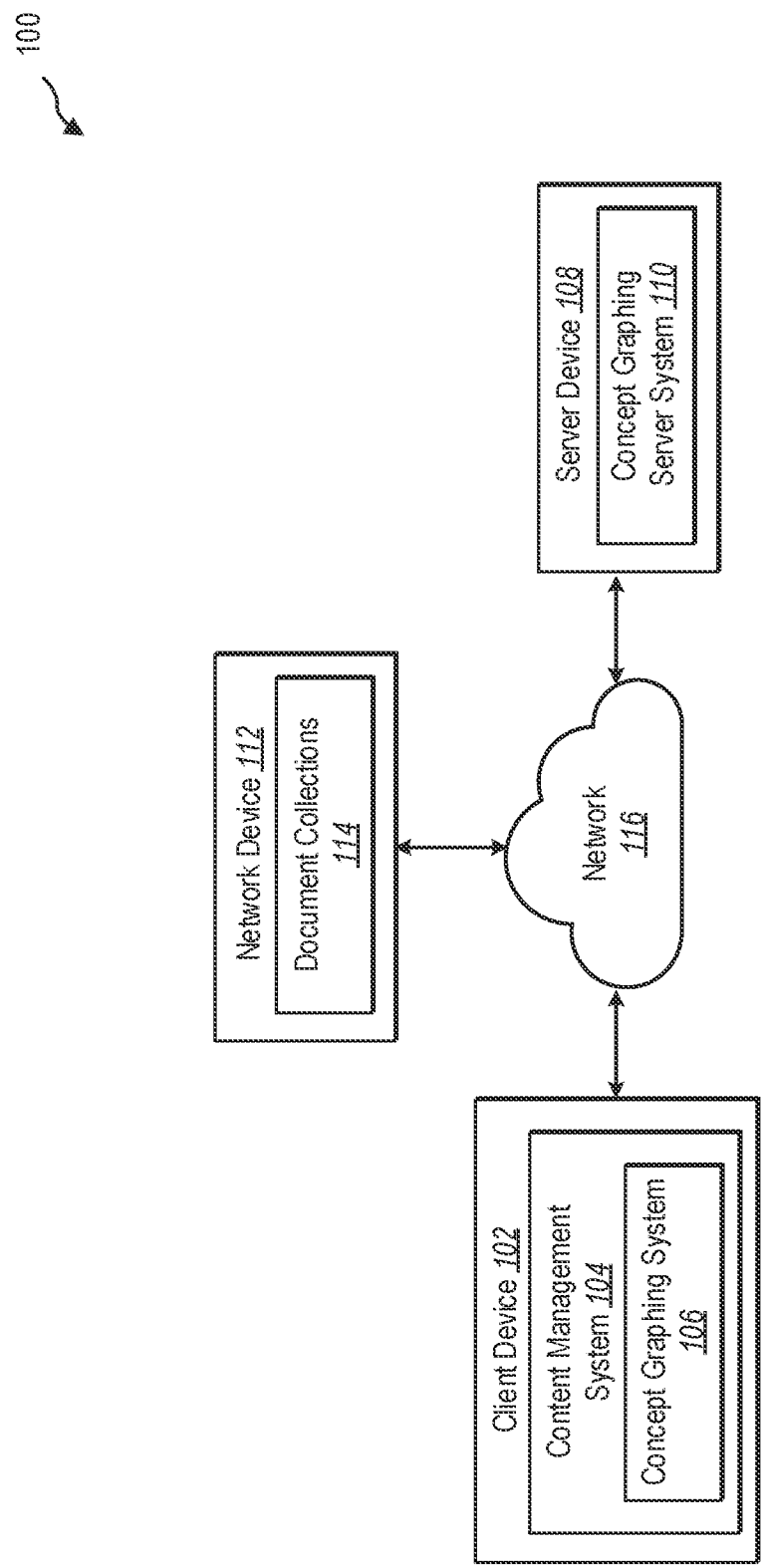
FIGS. 1A-1B illustrate a diagram of a computing system environment where a concept graphing system is implemented in accordance with one or more implementations.

Implementations of the present disclosure provide benefits and/or solve one or more of the foregoing or other problems in the art with systems, non-transitory computer-readable media, and methods utilizing a concept graphing system to determine and provide relationships between concepts within a document collection. More specifically, the concept graphing system can generate and utilize machine-learning models, such as a sparse graph recovery machine-learning model, to identify less-obvious correlations between concepts, including positive and negative concept connections, as well as provide these connections within a visual concept graph.

In various implementations, the concept graphing system provides a user interface that enables users to provide input easily and quickly regarding various concept input modes provided by the concept graphing system. For example, the concept graphing system provides a visual concept graph showing concept correlations based on the input of a single concept, multiple concepts, or no concepts. Additionally, in various implementations, the concept graphing system can determine and visually provide concept connections that conditionally appear only when other meaningfully related concepts are present.

To illustrate, in one or more implementations, the concept graphing system identifies a concept set that includes one, multiple, or no concept terms from a set of digital documents. In response, the concept graphing system can generate or provide a set of concepts (e.g., based on the input) to a sparse graph recovery machine-learning model to generate a precision matrix from the concept set and the set of digital documents, where the sparse graph recovery machine-learning model determines correlation strengths between pairs of concepts within sets of digital documents.

As mentioned above, the concept graphing system can generate a visual concept graph that features positive and negative relationships between concepts found in a collection of documents. In various implementations, the concept graphing system generates a document-concept matrix that indicates the occurrences of concepts used within a document collection. Additionally, the concept graphing system can use a sparse graph recovery machine-learning model based on the document-concept matrix and/or a set of concepts to generate a concept-concept relationship matrix. Indeed, in various implementations, the concept graphing system efficiently solves the graphical lasso problem to generate a precision matrix, which can be used as a foundation for generating a visual concept graph.

As provided below, compared to existing computing systems, the concept graphing system disclosed herein provides several technical benefits in terms of computing accuracy, flexibility, and efficiency. Indeed, the concept graphing system provides several practical applications that deliver benefits and/or solve problems associated with managing concept relationships in document collections.

To illustrate, in one or more implementations, the concept graphing system improves accuracy by detecting concept relationships that existing computing systems otherwise miss. For example, the concept graphing system can identify concepts within a document collection and generate an accurate concept mapping between concepts. The concept graphing system can then utilize deep learning models, such as a sparse graph recovery machine-learning model, to overcome the sparse graph recovery problem and present a visual concept graph that includes concept relationships between non-obvious concepts. Indeed, the concept graphing system can generate a visual concept graph that includes visual connections between concepts in the precision matrix including connection strength indications. In other implementations, the concept graphing system utilizes one or more non-deep learning models to solve the sparse graph recovery problem.

In addition, the concept graphing system can represent concept relationships in terms of both positive and negative correlations. For example, a positive correlation corresponds to the probability that two concepts occur together within a set of documents. A negative correlation between two concepts indicates that if one concept occurs in a document, there is a high probability that the other concept will be absent. In this manner, the concept graphing system accurately reveals omitted relationships between concepts and/or areas where concepts have not been explored together.

In various implementations, the concept graphing system improves efficiency over existing computing systems by pre-processing large document collections into smaller flat files. For example, the concept graphing system can convert 120,000 documents that require 400 gigabytes (GB) to store into a 70 megabyte (MB) file (e.g., stored as a document-concept matrix), which is over a 5700% reduction. In addition to requiring less memory, the concept graphing system requires fewer computing resources to process the file and determine concept-concept relationships. Indeed, by utilizing a reduced file, most modern-day computing devices can implement the concept graphing system to determine concept relationships from the document-concept matrix and display a visual concept graph.

In connection with utilizing fewer computing resources, the concept graphing system utilizes a more efficient machine-learning model than existing computing systems. For example, the concept graphing system utilizes a sparse graph recovery machine-learning model that determines correlation strengths between pairs of concepts within sets of documents. Indeed, the sparse graph recovery machine-learning model efficiently solves the graphical lasso (i.e., least absolute shrinkage and selection operator) problem. In some instances, the concept graphing system utilizes a uGLAD deep-learning model, which is more robust and gives superior performance (e.g., by enabling adaptive choices of the hyperparameters) compared to state-of-the-art algorithms, such as Block Coordinate Descent (BCD), Graphical-Iterative Shrinkage Thresholding algorithm (G-ISTA), and Alternating Direction Method of Multipliers (ADMM).

Furthermore, in various implementations, the concept graphing system provides increased flexibility over existing computing systems. For instance, the concept graphing system provides an interactive interface that allows users to input different numbers of concepts to be correlated within a document collection. For example, the concept graphing system facilitates a user providing a single concept or multiple concepts to analyze and include in a visual concept graph. Additionally, the concept graphing system can provide an accurate and relevant visual concept graph even when a request is made with no inputted concepts.

In various implementations, the concept graphing system provides an interactive interface that saves users multiple navigational steps by providing an all-in-one user interface as well as by anticipating future user inputs, which saves computing resources and reduces the number of steps needed to arrive at and/or visualize relevant concept relationships. Thus, unlike most existing computing systems that require multiple tools, numerous manual operations, and large amounts of computer processing to generate a visual concept graph, the concept graphing system efficiency facilitates these actions with minimal user interaction.

As illustrated in the foregoing discussion, the present disclosure utilizes a variety of terms to describe the features and advantages of one or more implementations described herein. For instance, the terms "electronic document" and "digital document" (or simply "document") refer to electronic text data. For example, a document can include structured or unstructured text data. Furthermore, a document may be used to convey information from one user (e.g., an author of a document), to another user (a recipient of a document). Examples of documents include, but are not limited to, papers (e.g., pdfs), electronic messages (e.g., IM, email, texts, etc.), word-processing documents, webpages, free-form text responses, charts, graphs, images, and/or other electronic documents or files that includes textual data.

Further, the terms "document collection," "document set," and "document corpus" generally refer to multiple text documents that are related, linked, and/or otherwise associated. A collection of documents can include two or more documents, but often includes many documents (e.g., hundreds, thousands, hundreds of thousands, millions, or more). In some embodiments, a user can combine or otherwise associate individual text documents together in a collection of documents. Alternatively, the collection of documents can include documents that are combined automatically by one or more systems. In some implementations, a document collection is related to a particular domain, such as research, machine-learning, medical treatments, studies, public policy, etc.

As used herein, the term "concept" refers to text that represents a language element. For example, a concept can refer to text contained text within a document. In some instances, a concept is a single word (e.g., "surgery"), a compound word (e.g., "toolbox"), or a string of words (e.g., "amino acids" or "nicotinic acetylcholine receptor"). In addition, a concept can include a combination of terms that make up a phrase or sentence. In some instances, a concept can include a symbol that connotes a meaning, such as a number, special character, or emoji. In one or more implementations, the words "concept," "concept term," and "term" are used interchangeably.

As used herein, the term "document-concept matrix" refers to a data structure that correlates documents in a document collection with concepts in the document collection. In some implementations, a document-concept matrix includes at least one row for each document and at least one column for each concept. In these implementations, the intersection of a document and a concept can be represented by a concept count value indicating the number of times the concept appears in the document. In various implementations, the concept count value includes a derivative of a count.

In various implementations, a document-concept matrix can be broadened to include any type of corpus-token relationship, where concepts are examples of tokens. Indeed, in various implementations, the concept graphing system utilizes a corpus-token matrix that tracks token occurrences (e.g., a token count). Indeed, examples of tokens include concepts, terms, genes, protein stems, product code prefixes, etc. Thus, the document-concept matrix can be generalized to any token that is included one or more times within a collection of content items (i.e., a content corpus).

As used herein, the terms "concept-concept matrix" and "precision matrix" refer to a data structure that correlates concepts to other concepts within a document collection. In various implementations, the concept-concept matrix includes more than mere covariance between concepts, but rather serves as an approximate precision matrix that includes latent correlations between concepts in a document collection, as further provided below.

As used herein, the term "visual concept graph" (or simply "concept graph") refers to a visual element that depicts relationships between concepts in a document collection. For example, a visual concept graph includes a chart or graph showing relationships between different concepts. In some instances, a visual concept graph includes both positive and negative correlations between the same and/or different concepts. In addition, a visual concept graph can include different visual effects (e.g., colors, thicknesses, patterns, etc.) to show magnitudes of connection strength or other correlation scores between concepts.

As used herein, the term "machine learning" refers to algorithms that model high-level abstractions in data by generating data-driven predictions or decisions from the known input data. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include latent Dirichlet allocation (LDA), multi-arm bandits models, linear regression models, logistical regression models, random forest models, support vector machines (SVG) models, neural networks (convolutional neural networks, recurrent neural networks such as LSTMs, graph neural networks, etc.), or decision tree models.

Additionally, a machine-learning model can include a sparse graph recovery machine-learning model (or simply "model" as used hereafter) that determines correlation strengths between pairs of concepts within sets of digital documents. In some implementations, the sparse graph recovery machine-learning model is a neural network that includes multiple neural network layers. In various implementations, the sparse graph recovery machine-learning model includes a uGLAD model that solves a graphical least absolute shrinkage and selection operator (LASSO) problem.

Figure 1B:
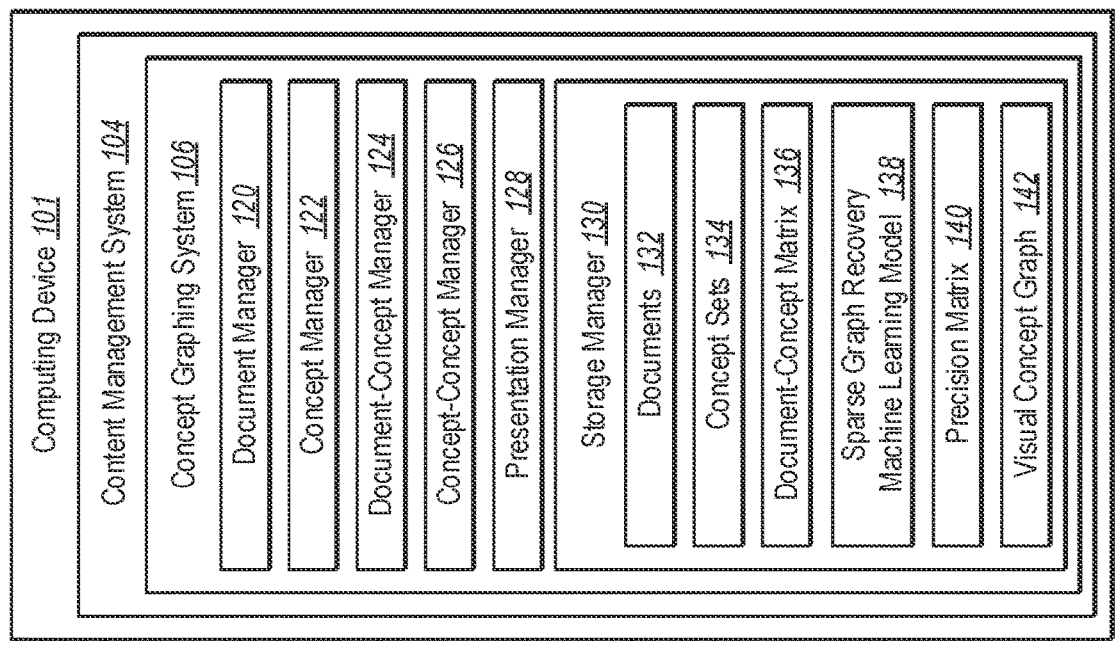

Additional detail will now be provided regarding the components and elements of the concept graphing system. For example, FIGS. 1A-1B illustrate a schematic diagram of an environment 100 (i.e., a digital medium system environment) for implementing a concept graphing system 106. In particular, FIG. 1A includes the environment 100 and FIG. 1B provides additional detail regarding components and elements of the concept graphing system 106.

As shown in FIG. 1A, the environment 100 includes a client device 102, a server device 108, and a network device 112, which can communicate via a network 116. Additional detail regarding these and other computing devices is provided below in connection with FIG. 9. In addition, FIG. 9 also provides additional detail regarding networks, such as the network 116 shown.

In various implementations, the client device 102 is associated with a user (e.g., a user client device), such as a user that interacts with the concept graphing system 106 to request a visual concept graph. As shown, the client device 102 includes a content management system 104. In various implementations, the content management system 104 can perform a variety of functions. For example, in one or more implementations, the content management system 104 facilitates the distribution of various digital content items (e.g., documents) across the network 116. In one or more implementations, the content management system 104 facilitates, identifies, receives, accesses, opens, loads, edits, modifies, moves, copies, shares, saves, removes, deletes, stores, downloads, transmits, and/or imports documents.

As also shown, the content management system 104 includes a concept graphing system 106. In various implementations, the concept graphing system 106 generates visual concept graphs from one or more document corpora. For example, the concept graphing system 106 generates a visual concept graph from a document collection from the document collections 114 stored on the network device 112. Additional details and components of the concept graphing system 106 are provided in FIG. 1B.

As just mentioned, the network device 112 includes the document collections 114. In addition to storing document collections, in one or more implementations, the document collections 114 generate, create, receive, obtain, encode, modify, store, transmit, share, or otherwise manage electronic documents. In various implementations, the document collections 114 are located across multiple network devices and/or network locations.

As shown, the environment 100 also includes the server device 108. The server device 108 includes a concept graphing server system 110. For example, in one or more implementations, the concept graphing server system 110 represents and/or provides similar functionality as described herein in connection with the concept graphing system 106. In some implementations, the concept graphing server system 110 supports the concept graphing system 106 on the client device 102. Indeed, in one or more implementations, the server device 108 includes all, or a portion of, the concept graphing system 106. For instance, the concept graphing system 106 on the client device 102 downloads and/or accesses an application from the server device 108

(e.g., a document-concept graphing program from the concept graphing server system 110) or a portion of a software application.

In some implementations, the concept graphing server system 110 includes a web hosting application that allows the client device 102 to interact with content and services hosted on the server device 108. To illustrate, in one or more implementations, the concept graphing server system 110 implements the concept graphing framework, which includes one or more object concept graphing machine-learning models. For example, the client device 102 (e.g., a mobile device) provides access to a document collection (e.g., via a document management application) to the concept graphing server system 110 on the server device 108, which provides back a document-concept matrix and/or a precision matrix to the client device 102, which the concept graphing system 106 converts into a visual concept graph.

Although FIG. 1A illustrates a particular number, type, and arrangement of components within the environment 100, various additional environment configurations and arrangements are possible. For example, the environment 100 includes any number of client devices. As another example, the server device 108 represents a set of connected server devices. As a further example, the client device 102 may communicate directly with the server device 108, bypassing the network 116 or utilizing a separate and/or an additional network.

As mentioned above, FIG. 1B provides additional detail regarding the capabilities and components of the concept graphing system 106. To illustrate, FIG. 1B shows a computing device 101 having the content management system 104 and the concept graphing system 106. For example, the computing device 101 represents either the client device 102 and/or the server device 108 introduced above.

In addition, as shown, the concept graphing system 106 includes various components and elements. For example, the concept graphing system 106 includes a document manager 120, a concept manager 122, a document-concept manager 124, a concept-concept manager 126, a presentation manager 128, and a storage manager 130. As also shown, the storage manager 130 can include documents 132, concept sets 134, a document-concept matrix 136, a sparse graph recovery machine-learning model 138, a precision matrix 140, and a visual concept graph 142.

As shown, the concept graphing system 106 includes the document manager 120. In one or more implementations, the document manager 120 receives, accesses, provides, edits, modifies, identifies, creates, or otherwise manages the documents 132. For example, the document manager 120 access documents from a document collection, such as the document collections 114 on the network device 112.

As shown, the concept graphing system 106 includes the concept manager 122. In various implementations, the concept manager 122 facilitates creating, modifying, storing, adding, removing, identifying, accessing, or otherwise managing concept sets 134. In various implementations, a concept set includes one or more concepts. In some implementations, a concept set is empty and includes no concepts. In these implementations, the concept manager 122 can generate a concept set (e.g., using statistical modeling) that includes multiple concept terms corresponding to a target document collection, as provided below.

As also shown, the concept graphing system 106 includes the document-concept manager 124. In various implementations, the document-concept manager 124 generates, identifies, edits, modifies, receives, accesses, provides, or otherwise manages a document-concept matrix 136. For example, the document-concept manager 124 creates a document-concept matrix 136 for a target document collection. In various implementations, the document-concept manager 124 creates a document-concept matrix 136 offline. In alternative implementations, the document-concept manager 124 creates a document-concept matrix on-the-fly in real time.

As shown, the concept graphing system 106 includes the concept-concept manager 126. In various implementations, the concept-concept manager 126 generates a precision matrix 140 (e.g., a concept-concept matrix). For example, in some implementations, the concept-concept manager 126 utilizes the document-concept matrix 136 and the sparse graph recovery machine-learning model 138 to generate the precision matrix 140. Additional detail regarding generating the precision matrix 140 is provided below in connection with FIG. 3A.

As also shown, the concept graphing system 106 includes the presentation manager 128. In various implementations, the presentation manager 128 generates, identifies, edits, modifies, receives, accesses, provides, or otherwise manages a visual concept graph 142. For example, in one or more implementations, the presentation manager 128 generates the visual concept graph 142 from the precision matrix 140. In some implementations, the presentation manager 128 applies visual effects to emphasize both positive and negative correlations between concepts in the visual concept graph 142.

Additionally, the concept graphing system 106 includes the storage manager 130. In various implementations, the storage manager 130 can include any data used by any of the components of the concept graphing system 106 in performing features and functionality described herein. For example, the storage manager 130 may include the documents 132, the concept sets 134, the document-concept matrix 136, the sparse graph recovery machine-learning model 138, the precision matrix 140, and the visual concept graph 142.

Figure 2:
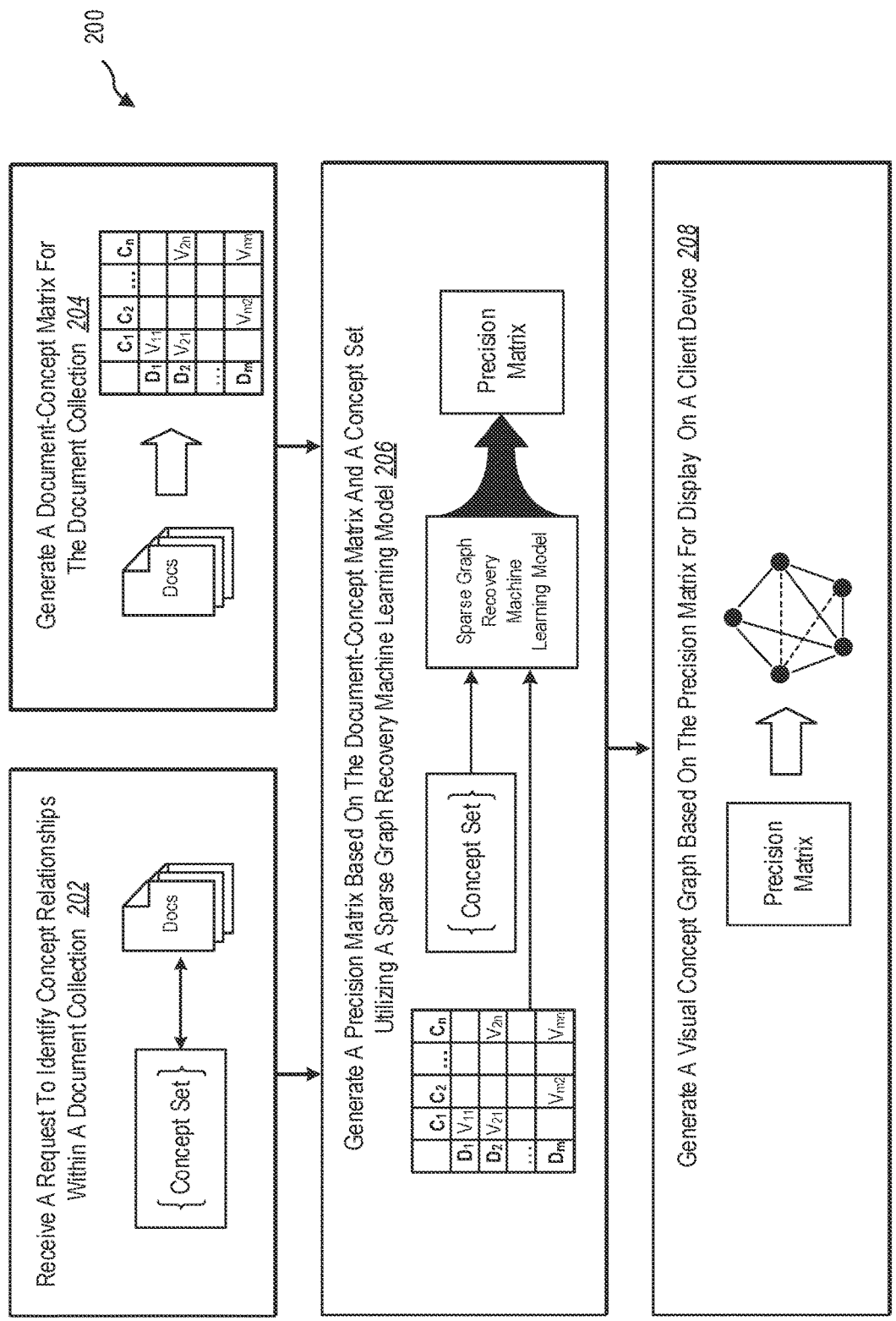
FIG. 2 illustrates an example workflow for providing a visual concept graph for a document collection in accordance with one or more implementations.

Additional detail in connection with an example implementation of the concept graphing system 106 is discussed in connection with FIG. 2. For example, FIG. 2 illustrates an example workflow for providing a visual concept graph for a document collection in accordance with one or more implementations. As shown, FIG. 2 illustrates a series of acts 200, which can be performed by the concept graphing system 106 and/or a content management system.

As shown in FIG. 2, the series of acts 200 includes an act 202 of receiving a request to identify concept relationships within a document collection. For instance, a user accessing documents in a document collection requests to identify correlations between concepts. For example, a medical researcher desires to see correlations between prescription drugs or drug side effects within a body of medical documents. In various implementations, the concept graphing system 106 receives a concept set in connection with the request, where the concept set includes zero, one, or multiple concepts to identify correspondences within the document collection. Additional detail regarding receiving concept relationship requests is provided below in connection with FIGS. 4-6.

In addition, FIG. 2 shows that the series of acts 200 includes an act 204 of generating a document-concept matrix for the document collection. For example, in various implementations, the concept graphing system 106 generates a document-concept matrix of a target document collection. In some instances, the concept graphing system 106 can generate a document-concept matrix by correlating document rows with concept columns. As noted, the concept graphing system 106 can generate the document-concept matrix offline (e.g., before the request) or in real time and/or on-the-fly (e.g., in response to the request). Additional detail regarding generating a document-concept matrix is provided below in connection with FIG. 3A.

As shown in FIG. 2, the series of acts 200 includes an act 206 of generating a precision matrix based on the document-concept matrix and a concept set utilizing a sparse graph recovery machine-learning model. For instance, in various implementations, the concept graphing system 106 provides the document-concept matrix and the concept set to a sparse graph recovery machine-learning model that is trained to determine correlation strengths between pairs of concepts within sets of digital documents. In response, the sparse graph recovery machine-learning model generates a precision matrix that indicates correlations between the concepts in the concept set with respect to the document collection (e.g., via the document-concept matrix). Additional detail regarding generating a precision matrix is provided below in connection with FIGS. 3A-3B.

As shown in FIG. 2, the series of acts 200 includes an act 208 of generating a visual concept graph based on the precision matrix for display on a client device. For example, in one or more implementations, the concept graphing system 106 converts the precision matrix into a visual concept graph. In some implementations, the concept graphing system 106 applies various visualization features and effects to the concept graph. Additional detail regarding generating a visual concept graph is provided below in connection with FIG. 3A and FIG. 7A.

Figure 3A:
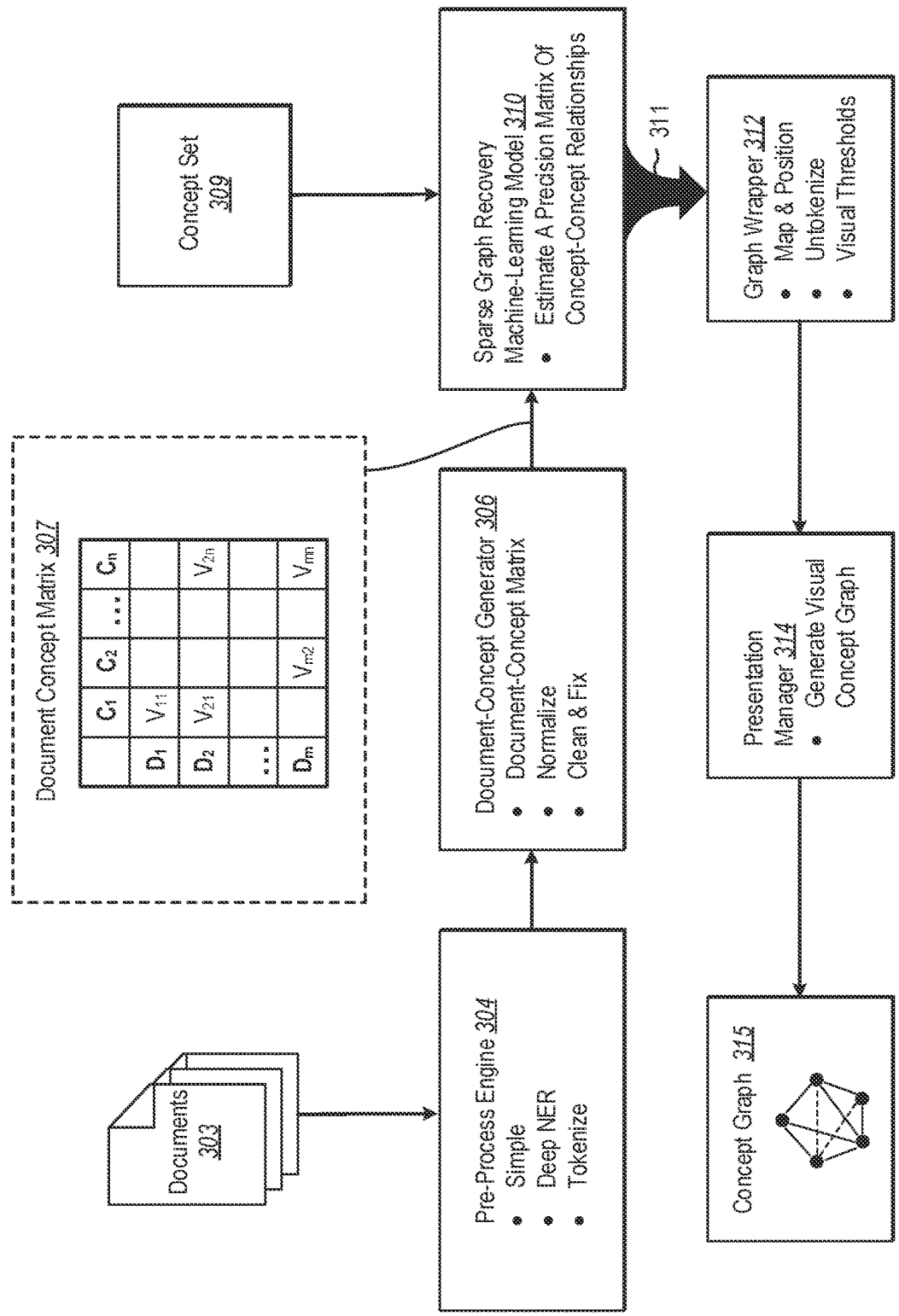
FIGS. 3A-3B illustrate a block diagram that includes additional details for generating and providing a visual concept graph for a document collection in accordance with one or more implementations.
Figure 3B:
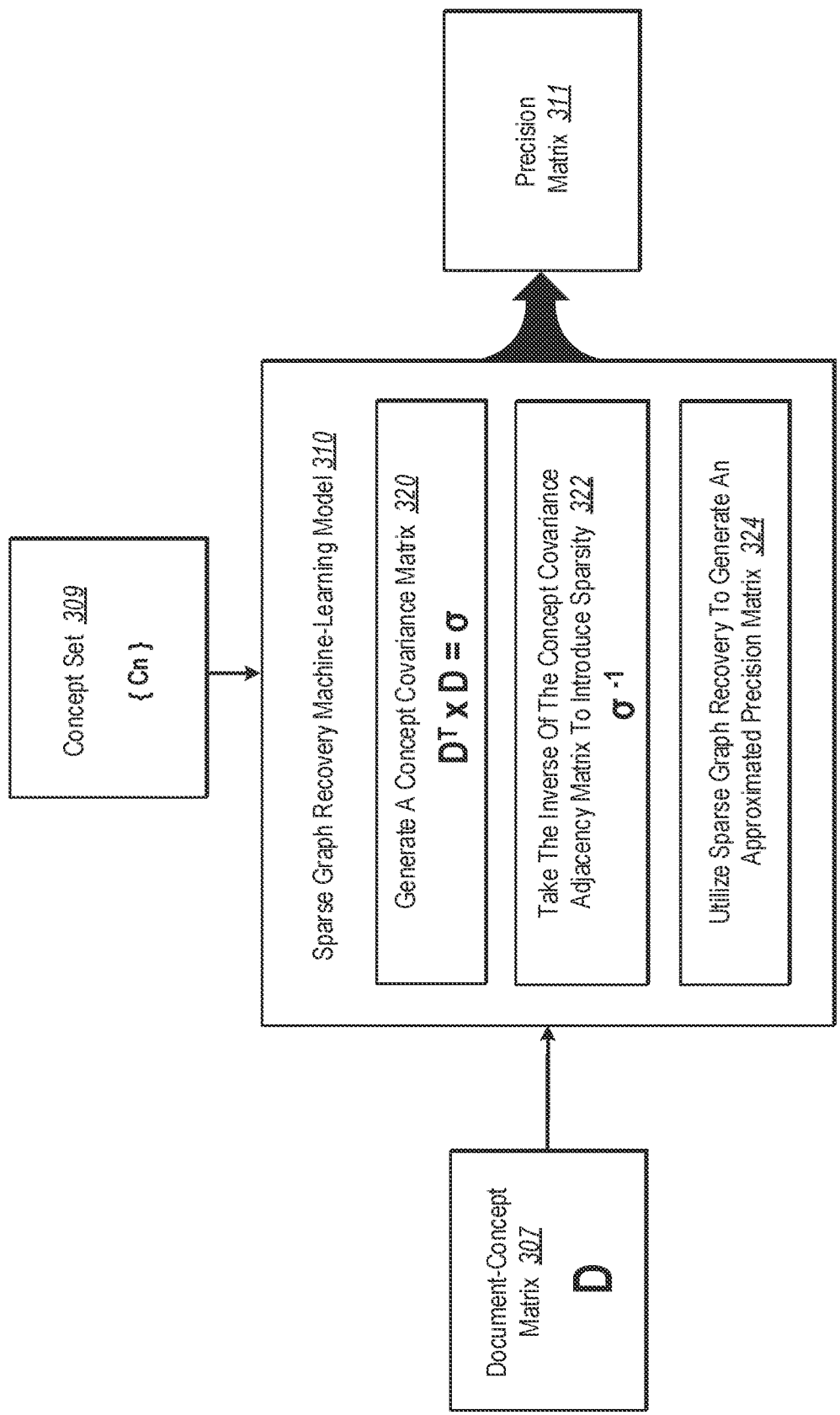

As noted above, FIGS. 3A-3B illustrate a block diagram that includes additional details for generating and providing a visual concept graph for a document collection in accordance with one or more implementations. In particular, FIG. 3A shows various components and elements corresponding to the concept graphing system 106. FIG. 3B includes additional detail regarding operations of the sparse graph recovery machine-learning model.

As shown, FIG. 3A includes documents 303. In various implementations, the documents 303 correspond to a set of related documents, formed into a document collection. In some implementations, the documents 303 are related by topic, such as medicine, political discourse, public policies, digital media, news, research, and academia. In various implementations, a document collection includes metadata indicating characteristics of the document collection. The documents 303 can range from a few documents to a large volume of millions of documents or can be a collection of document collections.

As noted above, the concept graphing system 106 can generate a document-concept matrix from a document collection. As shown in FIG. 3A, the concept graphing system 106 generates a document-concept matrix 307. As also shown, in various implementations, the concept graphing system 106 performs pre-processing actions on the documents 303 before generating the document-concept matrix 307.

To illustrate, the concept graphing system 106 can utilize a pre-process engine 304 to prepare the document collection (i.e., documents 303), which can include simple pre-processing, deep named entity recognition (NER), and/or tokenization. More specifically, in various implementations, the concept graphing system 106 performs simple pre-processing, such as case normalization, lemmatization, stemming, removing stop words, and/or other NLP (natural language processing) actions.

In some implementations, the concept graphing system 106 performs deep NER processing. For example, in some instances, the concept graphing system 106 utilizes one or more deep NER models to filter (e.g., select) domain-specific terms (i.e., concepts). For instance, for a document collection of medical literature, the concept graphing system 106 filters relevant medical terms. In various implementations, the concept graphing system 106 utilizes a predetermined subset of terms in connection with a deep NER model to narrow down the number of candidate concepts in the document collection. In a few implementations, the concept graphing system 106 receives a list of candidate concepts from a user, which is used in connection with a deep NER model.

In some implementations, the concept graphing system 106 tokenizes the concepts. For example, in some implementations, the concept graphing system 106 tokenizes concepts by adding them to a matrix or vector along with its corresponding index value. As mentioned above, the concept graphing system 106 can utilize any tokenizable object and not just terms, concepts, or words in a document collection. For example, the concept of graphing system 106 can tokenize genes, protein stems, product-code prefixes, symbols, numbers, and/or other object types.

As shown, FIG. 3A includes a document-concept generator 306. In various implementations, the concept graphing system 106 utilizes the document-concept generator 306 to generate the document-concept matrix 307. For example, the concept graphing system 106 generates the document-concept matrix 307 by correlating documents in the document collection with tokens (e.g., pre-processed concepts).

To further illustrate, in various implementations, the document-concept matrix 307 indicates correlations between documents and concepts (i.e., tokens). For example, as shown in FIG. 3A, the document-concept matrix 307 includes a row for each document in a document collection and a column for each of the concepts (e.g., from the subset of selected concepts). When a target concept appears in a target document, the concept graphing system 106 can include a concept count value (or a count derivative, such as TF-IDF (term frequency, inverse document frequency)) where the target document and the target concept intersect. If the target concept appears multiple times within the target document, the concept graphing system 106 can increment the concept count value. In some implementations, the document-concept matrix 307 includes other and/or additional information in the entries when a target document and a target concept meet (e.g., a binary value, a recency value, a timestamp, a proximity to a target concept, etc.).

As shown in the document-concept matrix 307, FIG. 3A includes a concept count value of "$V_{21}$" for Document 2 (i.e., $D_2$) and Concept 1 (i.e., $C_1$). Accordingly, the document-concept matrix 307 includes various concept count values indicating how often concepts appear in the documents 303.

In various implementations, the document-concept matrix 307 is a sparse file. For example, even with the concept count values populated across the matrix, the document-concept matrix 307 includes more blank or null entries than populated entries having concept count values. Accordingly, the concept graphing system 106 can apply compression and further reduce the size of the document-concept matrix 307. In this manner, the concept graphing system 106 can represent the documents 303 at a significantly reduced size. As an example, the concept graphing system 106 can reduce a document collection of 120,000 files and 400 gigabytes (GB) down to a single file of 70 megabytes (MB). Indeed, with smaller file sizes, the concept graphing system 106 can store multiple representations of large data collections on most modern computing devices, which otherwise would be unable to store even a single large document collection.

FIG. 3A also includes a sparse graph recovery machine-learning model 310. In various implementations, the concept graphing system 106 utilizes the sparse graph recovery machine-learning model 310 to generate a precision matrix 311 indicating concept-concept relationships. As shown, the concept graphing system 106 provides the document-concept matrix 307 and a concept set 309 to the sparse graph recovery machine-learning model 310 to generate the precision matrix 311. In various implementations, the sparse graph recovery machine-learning model 310 is an unsupervised deep-learning sparse graph recovery model (referred to as "uGLAD) that solves the graphical lasso (i.e., least absolute shrinkage and selection operator) problem. Additional detail regarding the sparse graph recovery machine-learning model 310 is provided below in connection with FIG. 3B.

As mentioned, the concept graphing system 106 provides the concept set 309 to the sparse graph recovery machine-learning model 310. For example, the concept set 309 includes multiple concepts (e.g., multiple terms), a single concept, or no concepts (e.g., an empty concept set). Additional detail regarding providing multiple concepts in a concept set is provided below in connection with FIG. 4. Additional detail regarding providing a single concept in a concept set is provided below in connection with FIG. 5. Further, additional detail regarding providing an empty concept set is provided below in connection with FIG. 6.

As shown in FIG. 3A, the concept graphing system 106 includes a graph wrapper 312. In various implementations, the concept graphing system 106 utilizes the graph wrapper to supplement the precision matrix 311 with visual features and effects. For instance, while the 106 can generate a plain concept graph from the precision matrix 311 (e.g., via the presentation manager 314), the concept graphing system 106 can first enhance the visual features and effects of the concept graph. In various implementations, the precision matrix 311 includes correlation scores and/or relationship values between concepts.

To illustrate, in various implementations, the graph wrapper 312 includes determining which concepts in the precision matrix 311 to map, locations of the concepts within a graph, and/or positions of mapped concepts relative to other mapped concepts. In some implementations, the graph wrapper 312 can un-tokenize concepts. For example, for a target concept, which will likely be stemmed (e.g., truncated) the concept graphing system 106 can identify each instance of the concept from the document collection along with any different endings of the concept (e.g., the terms of "study," "studying," "studied," "studies" are all versions of the word stem "stud*"). Then, the concept graphing system 106 can select the version of the concept most commonly used to represent the concept within the concept graph. In some implementations, the concept graphing system 106 can utilize the ending most commonly used across the concept set (and in some cases, even for tokens that do not have versions with that ending in the document collection).

In various implementations, the concept graphing system 106 can utilize the graph wrapper 312 to add visual features and effects based on visual thresholds. For instance, the concept graphing system 106 utilizes a correspondence threshold to determine whether to add a concept correlation to a concept graph. For example, the concept graphing system 106 includes a pair of correlated concepts if the correlation strength between the concepts is above 0.5 (e.g., a positive correlation) or below −0.5 (e.g., a negative correlation) and no paring if the correlation is between −0.5 and 0.5. In some implementations, the concept graphing system 106 utilizes the correspondence threshold to determine whether to add a concept connection or correlated concept pairing (e.g., a line) connecting the two concepts.

As noted above, the graph wrapper 312 can apply visual features and effects. For example, in one or more implementations, the concept graphing system 106 adds colored lines to indicate different connection types (e.g., red for positive and red for negative) between two concepts. In some implementations, the concept graphing system 106 uses colors, hues, and/or line thickness to indicate a magnitude of connection strength. For instance, a thicker or darker line represents a stronger correlation value between concepts. In some implementations, the concept graphing system 106 adds labels and/or values to a correlation between concepts in a concept graph.

In some implementations, the concept graphing system 106 utilizes one or more visual thresholds in connection with the visual features and effects. For example, the concept graphing system 106 utilizes various visual thresholds to determine which magnitude or type of visual effect to apply to a pair of correlated concepts. For instance, the concept graphing system 106 applies one of five shades of green to a correlated concept pair (e.g., a line connecting the two concepts) based on the connection strength of the correlation (e.g., a deeper shade for each 0.1 increment in the concept correlation score).

As shown, FIG. 3A includes the presentation manager 314. In various implementations, the concept graphing system 106 utilizes the presentation manager 314 to convert the precision matrix 311 and/or a modified/enhanced/wrapped precision matrix into a concept graph 315. In one or more implementations, the presentation manager 314 generates multiple versions of concept graphs and/or facilitates a user to apply modifications to a concept graph. In some implementations, the presentation manager 314 and the graph wrapper 312 are integrated together (e.g., the presentation manager 314 facilitates graph wrapping).

In various implementations, the concept graphing system 106 provides the concept graph 315 to a client device. For example, in response to a request to provide concept relationships, the concept graphing system 106 provides the concept graph 315 showing various relationships. Additional detail along with an example of providing a concept graph in connection with an interactive interface is provided below with respect to FIG. 7A.

As mentioned above. FIG. 3B provides additional detail regarding the sparse graph recovery machine-learning model 310. As shown, FIG. 3B includes the document-concept matrix 307, the concept set 309, the sparse graph recovery machine-learning model 310, and the precision matrix 311 (e.g., a concept-concept matrix or an adjacency matrix). In example implementations, the document-concept matrix 307 is structured in a multivariate Gaussian distribution (e.g., a normal distribution). In one or more implementations, the sparse graph recovery machine-learning model 310 is a fully interpretable model such that output is viewable at each iteration, which allows a user to see how concepts and concept connections (e.g., correlated concept pairings or lines) are removed and added at each model iteration.

In various implementations, the sparse graph recovery machine-learning model 310 is a uGLAD model that solves the graphical lasso problem, as described above. For example, in various implementations, the sparse graph recovery machine-learning model 310 includes neural networks that enable adaptive choices of the hyperparameters. In some implementations, the sparse graph recovery machine-learning model 310 does not require sparsity-related regularization hyperparameters to be pre-specified while learning the hyperparameters to generate the precision matrix 311.

In various implementations, the sparse graph recovery machine-learning model 310 requires fewer iterations to converge due to neural network-based acceleration of an unrolled optimization algorithm (e.g., Alternating Minimization) as well as leverages GPU-based acceleration. Further, in certain implementations, the sparse graph recovery machine-learning model 310 robustly handles missing values by leveraging the multi-task learning ability of the model as well as provides a multi-task learning mode that solves the graphical lasso objective to recover multiple graphs with a single uGLAD model. In alternative implementations, the concept graphing system 106 utilizes other types of sparse graph recovery machine-learning models that also address and/or solve the graphical lasso problem.

As shown in FIG. 3B, the sparse graph recovery machine-learning model 310 includes various actions that the concept graphing system 106 performs to generate the precision matrix 311 from the document-concept matrix 307 and the concept set 309. In particular, the concept graphing system 106 can perform an act 320 of generating a centered concept covariance matrix (or simply covariance matrix). For instance, in various implementations, the concept graphing system 106 generates a covariance matrix by combining the document-concept matrix 307 (i.e., D) with a transposed version of the document-concept matrix 307 to get a concept-concept matrix. For example, the concept graphing system 106 follows the formula of $cov(D)=1/M \times (D-\mu)^T(D-\mu)$ where $\mu$ is the column-wise mean of D. In various implementations, the covariance matrix has dimensions C×C, where C corresponds to the number of concepts (i.e., concept features) in the concept set 309 or document-concept matrix 307.

In addition, the concept graphing system 106 can perform an act 322 of formulating the problem as a graphical lasso objective with sparsity constraints. For instance, in various implementations, the covariance matrix (e.g., concept-concept matrix) inherently correlates most of the concepts together, which does not result in useful information. Accordingly, the concept graphing system 106 introduces sparsity to better isolate significant concept connections and/or remove less significant connections by formulating the problem as a graphical lasso objective (e.g., eliminate weaker connections overshadowed by stronger ones). In example implementations, the concept graphing system 106 can perform this action by taking the inverse of the covariance matrix.

In many instances, the inverse covariance matrix is an ill-conditioned matrix and is still not suited for obtaining useful information. Accordingly, as shown, the concept graphing system 106 can perform an act 324 of executing sparse graph recovery models to generate an approximate precision matrix. In various implementations, the concept graphing system 106 generates, approximates, and/or estimates the precision matrix (e.g., an estimated or approximated adjacency matrix) by filling a multivariate Gaussian distribution over the input data (e.g., the document-concept matrix 307 and/or concept set 309) to recover a precision matrix (e.g., via the acts 320-324).

In various implementations, the concept graphing system 106 trains the sparse graph recovery machine-learning model 310 in an unsupervised manner. For example, the sparse graph recovery machine-learning model 310 learns to generate a precision matrix from untagged document data from sample document collections to solve the graphical lasso problem. In some implementations, the concept graphing system 106 uses supervision to train the sparse graph recovery machine-learning model 310.

As mentioned above, FIG. 4 provides additional detail for generating a concept graph 315 based on receiving multiple concepts in a concept set. In particular, FIG. 4 illustrates generating and providing a visual concept graph for a document collection based on a multiple-concept input mode in accordance with one or more implementations.

As an overview, in some implementations, the concept graphing system 106 receives a request to generate a concept graph for a target document collection, where the request includes a list of multiple concepts to be explored within the document collection (i.e., a concept relationship request). For example, a medical researcher is exploring a document collection of medical literature and desires to study the effect that particular proteins interact with each other or the effect that a select group of proteins has on particular medical conditions. Accordingly, the researcher provides a list of concepts in connection with a target document collection and, in response, the concept graphing system 106 can automatically generate a concept graph that indicates concept connections based on the list of concepts (e.g., a concept set).

Figure 4:
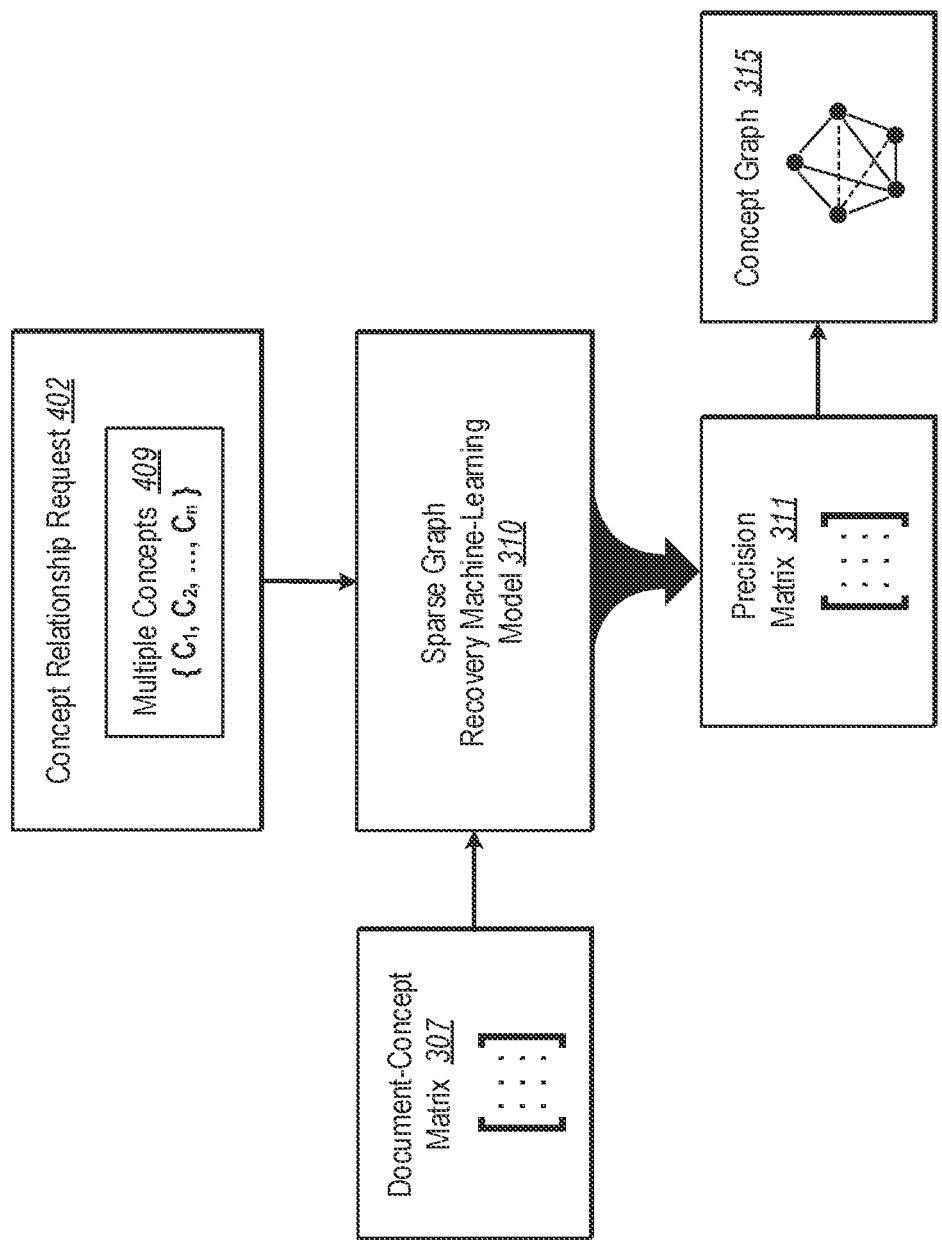
FIG. 4 illustrates generating and providing a visual concept graph for a document collection based on a multiple-concept input mode in accordance with one or more implementations.

As shown, FIG. 4 includes a concept relationship request 402 including multiple concepts 409. In response, the concept graphing system 106 can provide the document-concept matrix 307 and multiple concepts 409 to the sparse graph recovery machine-learning model 310. In particular, the concept graphing system 106 receives the multiple concepts 409 as input from a user via an interactive graphical user interface (or "interactive interface") such as the interactive interface shown in connection with FIG. 7A below. In response, the concept graphing system can utilize the sparse graph recovery machine-learning model 310 to generate the precision matrix 311 as well as convert the precision matrix 311 into the concept graph 315, as described above.

Indeed, in one or more implementations, the concept graphing system 106 can identify, analyze, and process the concepts from the multiple concepts 409 against the document-concept matrix 307 to generate the precision matrix 311. In some implementations, one or more of the concepts in the multiple concepts 409 are not found in the document-concept matrix 307 and/or do not yield a correlation score with other concepts that satisfy a correlation threshold. In these implementations, the concept graphing system 106 can still include these one or more concepts in the concept graph 315 to indicate a lack of any significant concept correlation with these one or more concepts. In alternative implementations, the concept graphing system 106 can omit these concepts and/or otherwise indicate to the user that these one or more concepts lack sufficient correlation (including any negative correlations) with other concepts in the multiple concepts 409.

Figure 5:
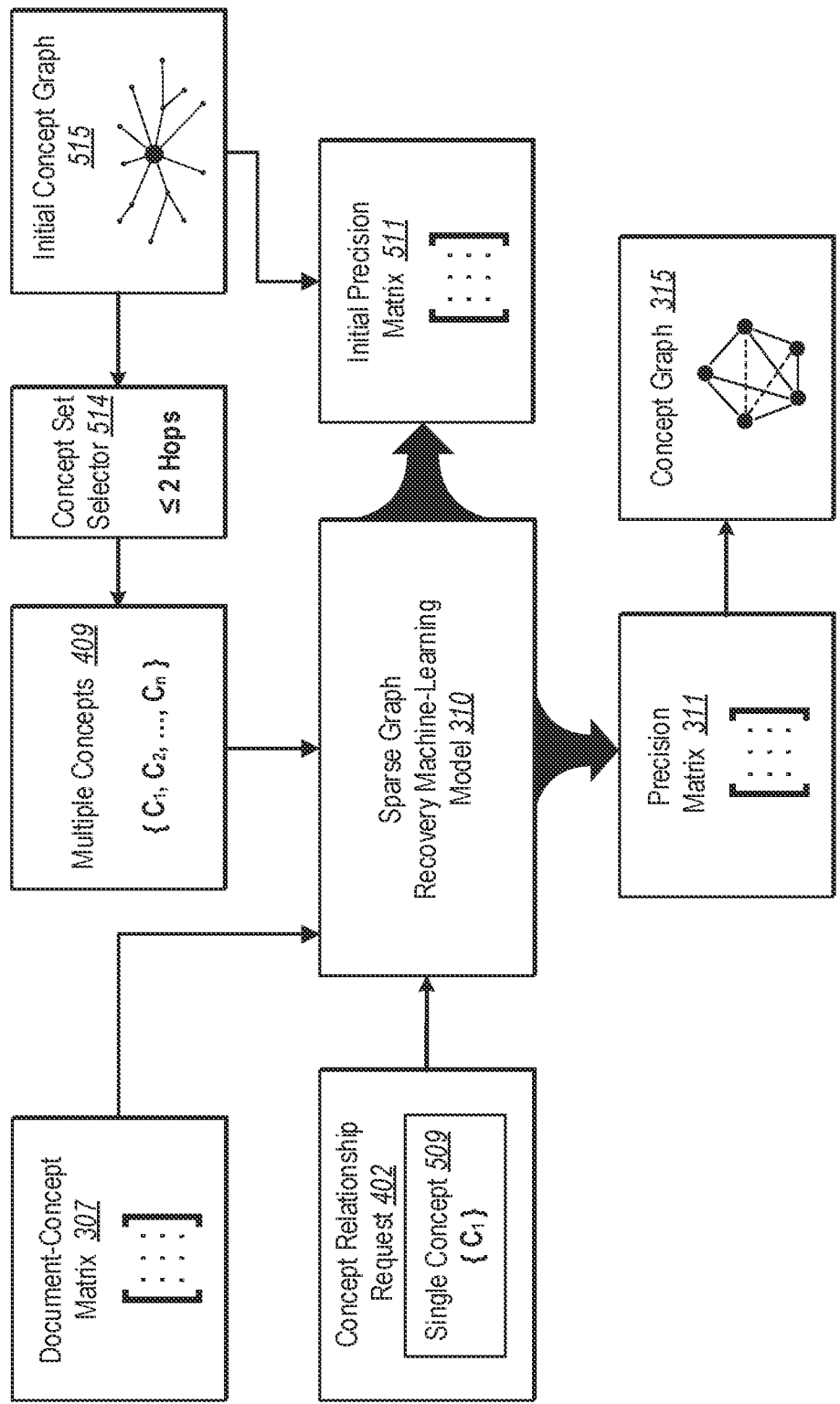
FIG. 5 illustrates generating and providing a visual concept graph for a document collection based on a single-concept input mode in accordance with one or more implementations.

In some implementations, rather than providing multiple concepts to be analyzed with respect to a document collection, the concept graphing system 106 receives a single concept. To illustrate, FIG. 5 shows the concept graphing system 106 receiving a concept relationship request 402 having a single concept 509. For example, a user provides a single concept to be analyzed for conceptual relationships with respect to a document collection.

As shown, the concept graphing system 106 can generate an initial precision matrix 511 utilizing the sparse graph recovery machine-learning model 310 based on the single concept 509 and the document-concept matrix 307. For example, the concept graphing system 106 generates the initial precision matrix 511 to indicate correlation scores between the single concept 509 and other concepts in the document collection.

In many implementations, the concept graphing system 106 will find a larger number of correlations between the single concept 509 and other concepts. Accordingly, the concept graphing system 106 can narrow or whittle down the number of concepts that correlate with the single concept 509. To illustrate, in various implementations, the concept graphing system 106 generates an initial concept graph 515. In various implementations, the initial concept graph 515 is akin to a hub-and-spoke graph where the single concept 509 is the central hub and a number of other concepts are connected, either directly or indirectly, as spokes. In some implementations, concepts with stronger connection strengths to the single concept 509 are located closer to the single concept 509 within the initial concept graph 515 than concepts with weaker connection strengths.

As shown in FIG. 5, the concept graphing system 106 can utilize a concept set selector 514 to select (e.g., extract) a subset of concepts from the initial concept graph 515 based on a selection threshold. For example, in one or more implementations, the concept graphing system 106 selects or extracts a subset of concepts that are within a predetermined number of hops of the single concept 509, such as one, two, or three hops. In some implementations, the concept graphing system 106 selects or extracts a subset of concepts that are within a predetermined radius of the single concept 509. In various implementations, the concept graphing system 106 selects or extracts a subset of concepts that have a correlation score satisfying a minimum threshold number with the single concept 509.

In various implementations, the concept graphing system 106 utilizes the subset of selected concepts to create a concept set having multiple concepts. Accordingly, as shown in FIG. 5, the concept graphing system 106 creates the multiple concepts 409 from the subset of concepts selected by the concept set selector 514. In some implementations, the concept graphing system 106 creates the multiple concepts 409 by updating the single concept 509 (e.g., requested concept set) to include the selected subset of concepts.

Upon generating the multiple concepts 409, the concept graphing system 106 can follow the steps provided above in FIG. 4 to generate the concept graph 315. Indeed, the concept graphing system 106 generates a precision matrix 311 utilizing the sparse graph recovery machine-learning model 310 based on the document-concept matrix 307 and the multiple concepts 409. Then, the concept graphing system 106 generates the concept graph 315 from the precision matrix 311 and provides the concept graph 315 in response to the concept relationship request 402. An example concept graph generated from the input of a single concept 509 is provided below in connection with FIG. 7B.

In one or more implementations, the concept graphing system 106 provides the initial concept graph 515 to the user in response to the concept relationship request 402. In some implementations, the concept graphing system 106 filters out concepts in the initial concept graph 515 that are not selected by the concept set selector 514 and/or included in the selected concept set. In various implementations, the concept graphing system 106 allows the user to provide input relaxing or strengthening the selection threshold of the concept set selector 514 to view additional or fewer concepts correlated to the single concept 509.

In some implementations, the concept graphing system 106 receives more than one concept but less than a minimum concept set threshold. For example, if the minimum concept set threshold is five and the concept relationship request 402 includes three concepts, the concept graphing system 106 can follow the actions shown in FIG. 5 to generate the multiple concepts 409 from the three inputted concepts (e.g., by expanding the "hub" to include the three inputted concepts and/or by running each inputted concept separately and combining the subset of selected concepts).

In some implementations, the concept relationship request 402 does not contain any concepts. Rather, the concept set inputted by the user is empty or contains zero (i.e., 0) concepts. In these implementations, the concept graphing system 106 can automatically determine and generate a concept set (e.g., utilizing statistical modeling) to use as input to sparse graph recovery machine-learning model 310. To illustrate, FIG. 6 shows an example of this implementation.

Figure 6:
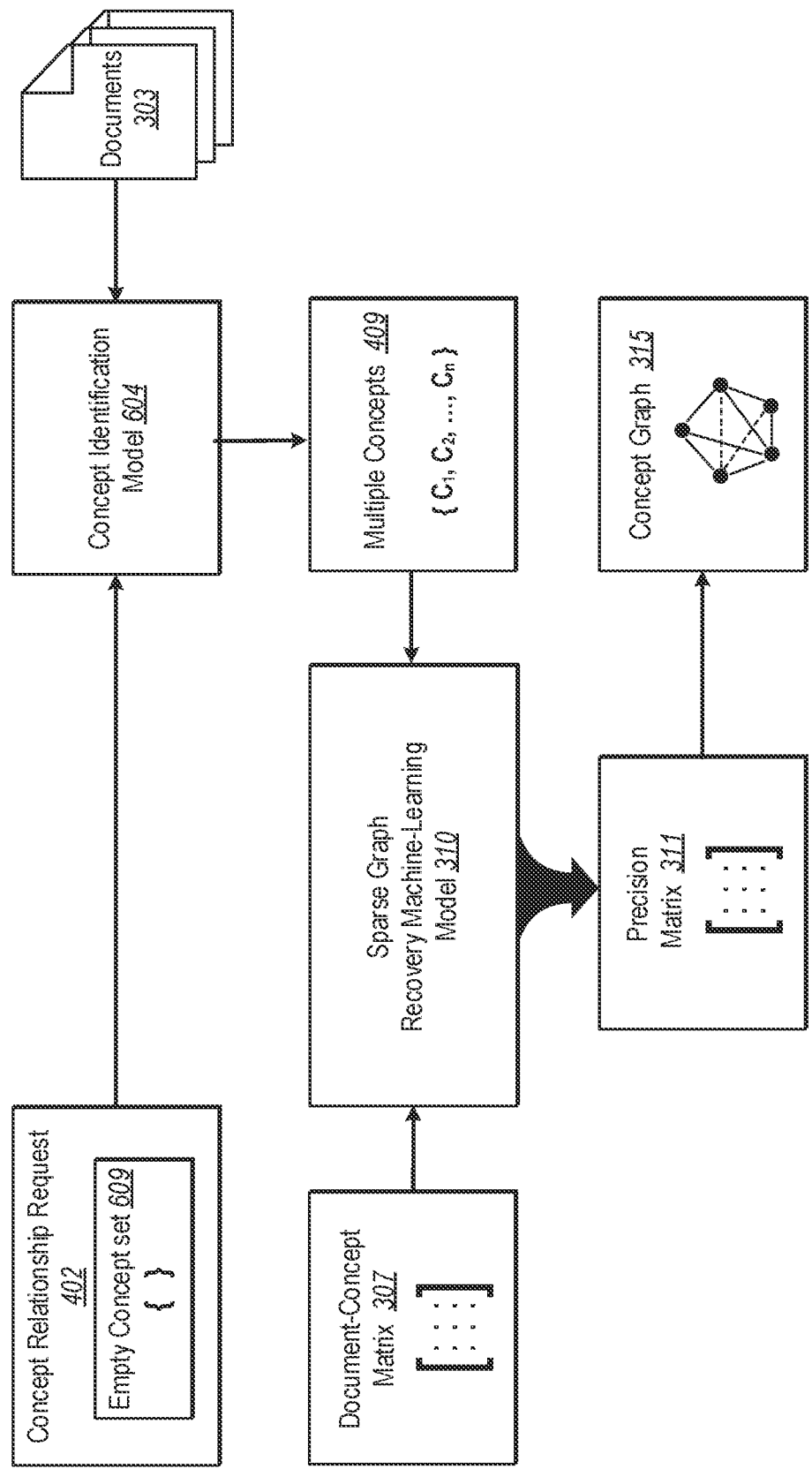
FIG. 6 illustrates generating and providing a visual concept graph for a document collection based on an empty-concept input mode in accordance with one or more implementations.

As shown in FIG. 6, the concept relationship request 402 includes an empty concept set 609. Here, the concept graphing system 106 detects the empty concept set 609 and utilizes a concept identification model 604 to generate multiple concepts from the documents 303. In some implementations, the concept identification model 604 utilizes statistical modeling with the document-concept matrix 307 to determine a subset of concepts to serve as input to the sparse graph recovery machine-learning model 310.

In one or more implementations, the concept graphing system 106 utilizes the concept identification model 604 to identify one or more statistical models or functions (e.g., statistical improbably phrases, commonly used unique terms, pairs of terms used near each other across the document collection, etc.) to determine a subset of concepts within the set of documents 303 (e.g., or the document-concept matrix 307). In some implementations, the concept graphing system 106 utilizes the concept identification model 604 to select the subset of concepts based on metadata, author tags, abstracts, or other curated portions within the document collection. In various implementations, the concept graphing system 106 utilizes the concept identification model 604 to identify the subset of concepts by weighting candidate concepts and selecting the subset from the weighted list (e.g., either by rank or randomly).

In some implementations, the concept graphing system 106 utilizes the concept identification model 604 to provide the subset of selected concepts to the user and enables the user to provide input to add, remove, edit, or otherwise modify the subset of selected concepts before processing the subset and generating a concept graph 315. For example, the concept graphing system 106 provides the subset of concepts within an interactive interface.

As shown in FIG. 6, the concept identification model 604 outputs the selected subset of concepts as the multiple concepts 409. Then, upon generating the multiple concepts 409, the concept graphing system 106 can follow the steps provided above in FIG. 4 to generate the concept graph 315.

Figure 7A:
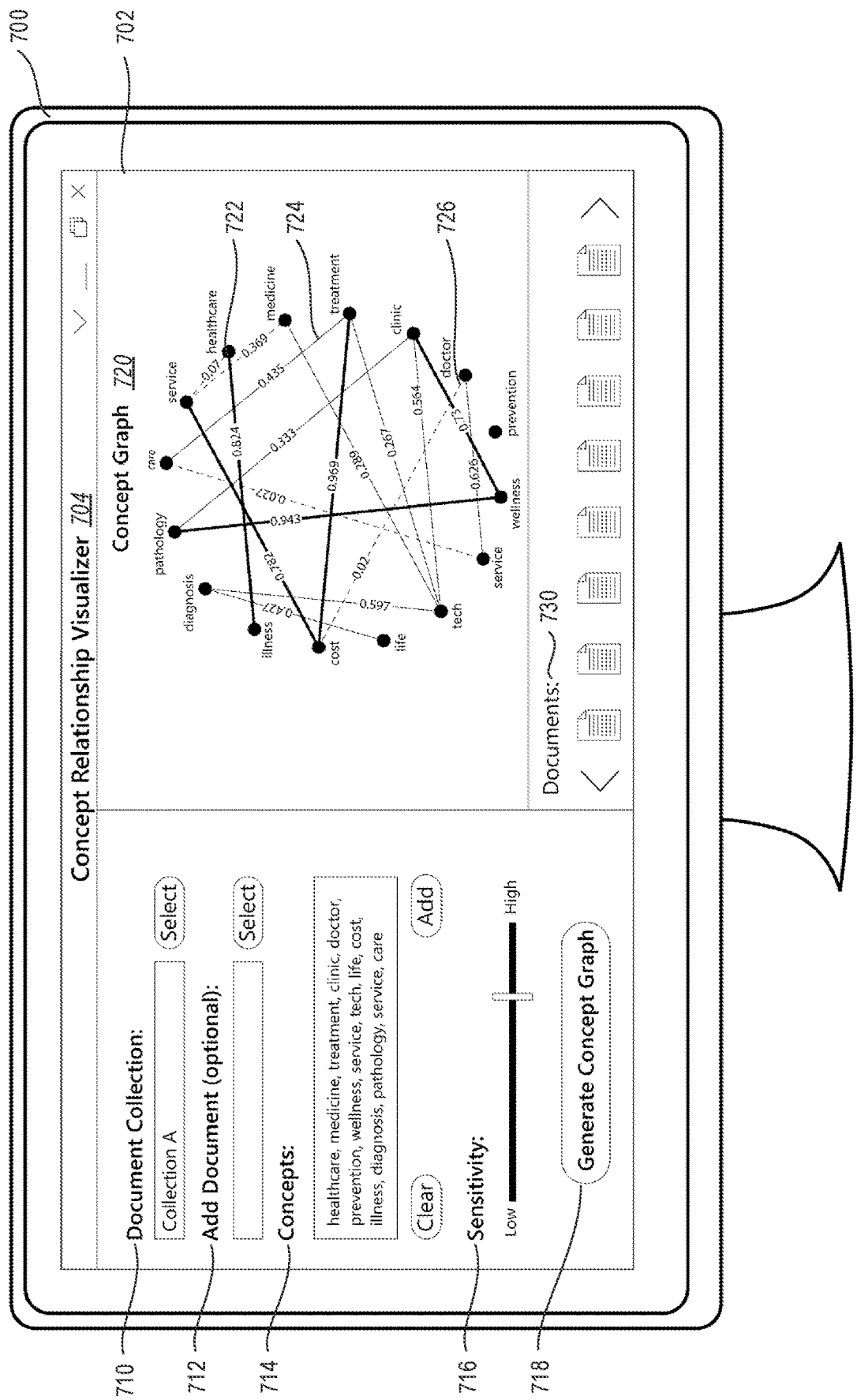
Figure 7C:
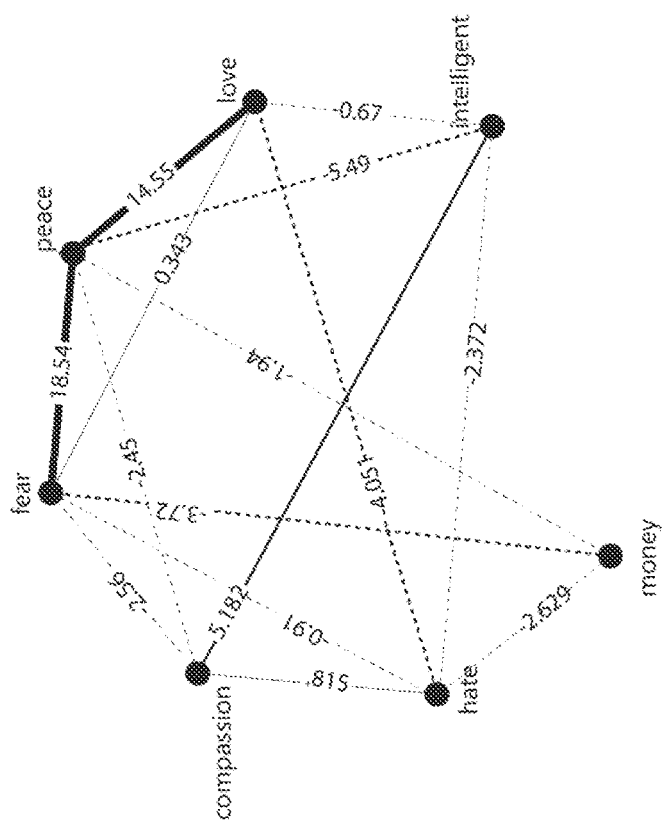
Figure 7C:
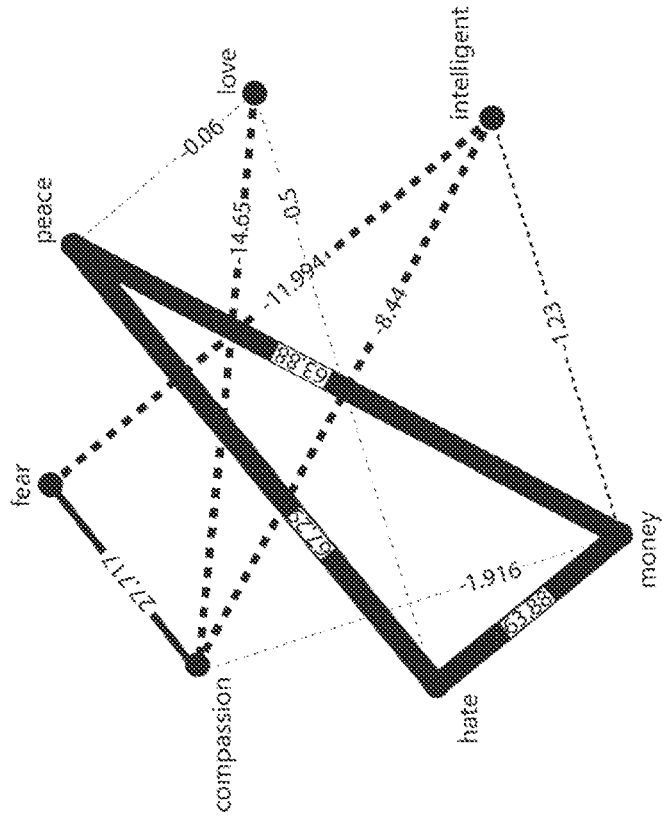

As mentioned above, FIGS. 7A-7C provide additional detail and an example of providing a concept graph in connection with an interactive interface. In particular, FIG. 7A illustrates a user interface for providing a visual concept graph for a document collection in accordance with one or more implementations. FIG. 7C illustrates examples of similar visual concept graph based on different document collections.

As shown, FIG. 7A includes a computing device 700 having a graphical user interface 702 that displays an interactive interface of a concept relationship visualizer 704. In some implementations, the computing device 700 is an example of the client device 102 introduced above.

As also shown, the concept relationship visualizer 704 is an interactive interface that includes various interactive elements and options for requesting, modifying, and viewing a concept graph with respect to a document collection. In particular, the concept relationship visualizer 704 includes various selectable elements including a document collection element 710, an optional document addition element 712, a concepts element 714, a sensitivity element 716, and a generate concept graph element 718. Additionally, the concept relationship visualizer 704 includes a concept graph 720 having concept nodes 722, positive concept edges 724, and negative concept edges 726. Further, the concept relationship visualizer 704 includes a documents panel 730 from the selected document collection.

As shown, the concept relationship visualizer 704 includes the document collection element 710. In various implementations, the document collection element 710 allows a user to select one or more document collections (e.g., document corpora). For example, interaction with the document collection element 710 facilitates a user to select a document collection stored locally or remotely. In some implementations, the document collection element 710 provides a list of document collections that have been pre-processed by the concept graphing system 106 into document-concept matrices. As shown, the document collection element 710 includes the concept graphing system 106 receiving Collection A as input.

In some implementations, the concept relationship visualizer 704 provides an option to select a specific domain. For example, the concept graphing system 106 enables a user to input a domain rather than selecting a document collection, and, in response, the concept graphing system 106 identifies and selects one or more appropriate document collections. In some implementations, the concept graphing system 106 utilizes the domain selection to identify and/or filter concepts from the selected document collection. In this manner, the concept graphing system 106 can generate a document-concept matrix more efficiently by utilizing fewer computing resources.

As shown, the concept relationship visualizer 704 includes the optional document addition element 712. In one or more implementations, the optional document addition element 712 provides an option for a user to select additional documents to optionally add to the document collection for processing by the concept graphing system 106. In various implementations, upon receiving input that adds one or more additional documents, the concept graphing system 106 can supplement an existing document-concept matrix with additional documents by adding additional rows for each additional document along with corresponding concept count values (or derivatives of the count values (e.g., TF-IDF)). In some implementations, the concept graphing system 106 generates the document-concept matrix of the document collection with the additional documents included.

As shown, the concept relationship visualizer 704 includes the concepts element 714. In various implementations, the concepts element 714 facilitates a user inputting concepts to target within the selected document collection. In one or more implementations, the concepts element 714 provides a user with a list of concepts identified in the document collection (e.g., included as tokens within a document-concept matrix of the document collection). In some implementations, the concepts element 714 allows a user to add, remove, edit, or otherwise manage concepts of interest.

As noted above, the concept graphing system 106 may receive user input for many, a single, or zero concepts. Accordingly, the concepts element 714 enables a user to enter multiple concepts, a single concept, or to leave the concepts element 714 empty or blank. In some instances, the concept graphing system 106 provides an indication to the user regarding the different concept input modes and the different actions that the concept graphing system 106 takes based on the selected concept input mode. For example, the concept graphing system 106 indicates that when the concept input mode of a single concept is detected, the concept graphing system 106 will first identify correlated concepts, then provide a concept graph of the correlated concepts. In some instances, the concept graphing system 106 provides an option to display an initial concept graph in place of, or in addition to, the concept graph 720, as provided above.

As shown, the concept relationship visualizer 704 includes the sensitivity element 716. In one or more implementations, the concept graphing system 106 enables a user to adjust the correlation score sensitivity, which can affect the number of concept nodes 722 displayed in the concept graph 720. In some implementations, the sensitivity element 716 corresponds to correlation score thresholds for displaying the positive concept edges 724 and/or the negative concept edges 726 (i.e., a connection strength edges) in the concept graph 720.

Additionally, in various implementations, the concept relationship visualizer 704 can include additional or alternative options and elements for adjusting parameters of the sparse graph recovery machine-learning model utilized to generate the concept graph 720. Likewise, the concept relationship visualizer 704 can include options and elements for changing the visual features and effects of the concept graph 720 (e.g., arrange the concept nodes 722 alphabetically, based on input order, based on the number of correlated concept pairings, and/or based on connection strengths). For example, the interactive interface allows a user to modify the chart type, themes, colors, thicknesses, styles, etc. as well as to show/hide elements of the concept graph 720.

As shown, the concept relationship visualizer 704 includes the generate concept graph element 718. In response to detecting the selection of the generate concept graph element 718, the concept graphing system 106 can generate and provide the concept graph 720 for display based on the selected concepts. In some implementations, the concept graphing system 106 generates a document-concept matrix on-the-fly in real time based on the selected document collection. In alternative implementations, the concept graphing system 106 utilizes a pre-generated document-concept matrix. In various implementations, the concept graphing system 106 supplements a pre-generated document-concept matrix with additional documents, as provided above.

As shown, the concept relationship visualizer 704 includes the concept graph 720. As noted above, the concept graph 720 can include concept nodes 722, positive concept edges 724, and negative concept edges 726. For instance, the concept nodes 722 can include labels of the concepts included in the concept graph 720. Indeed, the concept graph 720 can include connection strength edges between connected nodes of the concept nodes 722 that indicate a connection strength between two connected concept nodes.

The positive concept edges 724 can include labels indicating the connection strength between two connected nodes of the concept nodes 722. In addition, the positive concept edges 724 can be shown in different hues, line thicknesses, etc. based on the magnitude of the connection strength between two connected nodes of the concept nodes 722 (e.g., with stronger connections are darker hues and/or thicker lines). Likewise, the negative concept edges 726 can have labels and/or varying hues, line thickness, etc.

In various implementations, the concept graph 720 displays one or more nodes of the concept nodes 722 that do not have a correlated concept pairing or concept connections (e.g., a line) with other concept nodes. For example, a concept node is included as input in the concepts element 714 but fails to have a correlation score (positive or negative) with the other inputted concepts to warrant displaying a correlated concept pairing. In some implementations, the concept graph 720 does not include and/or hides these un-connected concept nodes.

As shown, the concept graph 720 is a line graph that connects the concept nodes 722 based on their respective correlated concept pairings with other concept nodes. While the concept graph 720 appears circular, other shapes, styles, arrangements, and designs are possible. Further, in some instances, the concept graphing system 106 can position the concept nodes 722 with stronger connection strengths closer together. Moreover, in various implementations, the concept graphing system 106 presents the concept graph 720 as another type of graph (e.g., a Venn diagram, area chart, bubble chart, pictograph, radar chart, bar graph, tree graph, etc.). In some implementations, the concept graphing system 106 provides a list, table, or matrix version of the concept graph 720 (e.g., a text-based version).

In some implementations, the concept graphing system 106 provides a knowledge graph in connection with the concept graph 720. As shown, the concept graph 720 is distinct and different from a knowledge graph, however, in many instances, the concept graph 720 can be used in conjunction with a knowledge graph. For example, the concept graphing system 106 provides a knowledge graph based on a document collection that enables a user to select concepts for the concept graph 720. As another example, a user can compare correlated concept pairings between two (or more) concept nodes from the concept graph 720 to see if the two (or more) concepts nodes are included in the knowledge graph and how they are connected (e.g., directly or indirectly).

In various implementations, the concept graphing system 106 provides for interaction with the concept graph 720. For example, the concept graphing system 106 can facilitate highlighting, hiding, removing, adding, or modifying the concept nodes 722 from the concept graph 720. In some implementations, the concept graphing system 106 facilitates providing additional information about a concept node, such as a number or frequency of appearance in the document collection, different versions, usage trends, etc.

Further, the concept graphing system 106 can facilitate interaction with documents in the document collection based on the concept nodes 722. For example, in some implementations, upon detecting the selection of a correlated concept pairing between two of the concept nodes 722, the concept graphing system 106 displays the documents in the documents panel 730 with the concepts selected or otherwise indicated. In some implementations, the concept graphing system 106 populates the documents panel 730 with documents that best correlate to the concept nodes 722 displayed within the concept graph 720.

FIG. 7B provides an example of the concept graphing system generating a visual concept graph from a single concept. As shown, FIG. 7B includes the computing device 700, the graphical user interface 702, and the concept relationship visualizer 704 described above along with several similar elements (not numbered for simplicity). In addition, the concept relationship visualizer 704 shows the concepts element 715 having a single concept as input (i.e., "Dialysis").

From the single concept, the concept graphing system 106 can generate a concept graph 732 as described above in connection with at least FIG. 5. For example, the concept graphing system 106 utilizes the sparse graph recovery machine-learning model to generate an initial precision matrix and initial concept graph. Then, the concept graphing system 106 identifies a subset of concepts to include in a concept set. For example, given the single concept of "Dialysis" and a target document collection, the concept graphing system 106 identifies the concepts of tissue, recovery, patient, cancer, renal, cell, tumor, failure, containing, and active among other concepts to include on the concept set. Then, as described above, the concept graphing system 106 generates the concept graph 732 utilizing the sparse graph recovery machine learning model based on the concept set and the document collection.

Also, as shown in the concept graph 732, the concept graphing system 106 sets a correspondent threshold of 0.1. Accordingly, any pair of concepts that has a connection strength above the correspondent threshold includes a correlated concept pairing (e.g., a concept connection or a line) and any pair of concepts that has a connection strength below the correspondent threshold does not show a line in the concept graph 732. In various implementations, such as the one shown, because the single concept is used to determine the updated concept set, the concept graph 732 that results does not include any negative correlating concepts. Indeed, for a concept to be selected within the concept set, a positive concept correlation exists with the single concept.

As noted above, FIG. 7C illustrates examples of similar visual concept graph based on different document collections. In particular, FIG. 7C includes two visual concept graphs corresponding to different document collections. As shown, FIG. 7C includes a web text visual concept graph 740 and an American literature visual concept graph 750. The web text visual concept graph 740 corresponds to a collection of web text, such as new articles while the American literature visual concept graph 750 corresponds to a collection American literature novels. Additionally, as shown, the concept set includes the concepts of love, peace, fear, compassion, hate, money, and intelligence.

As illustrated, the two concept graphs yield different concept correlations. For example, the web text document collection has a very strong correspondence between the concept pairs of peace—hate, peace—money, and money—hate as well as a negative correspondence between the concept pair of compassion—intelligence. In contrast, the American literature document collection has a negative correlation between the concept pairs of peace—money and money—hate, but no concept correlation between the concept pair of peace—hate. Additionally, the American literature document collection has a positive correspondence between the concept pair of compassion—intelligence.

Accordingly, based on the document collection and the concept collections, the concept graph can yield drastically different results.

Figure 8:
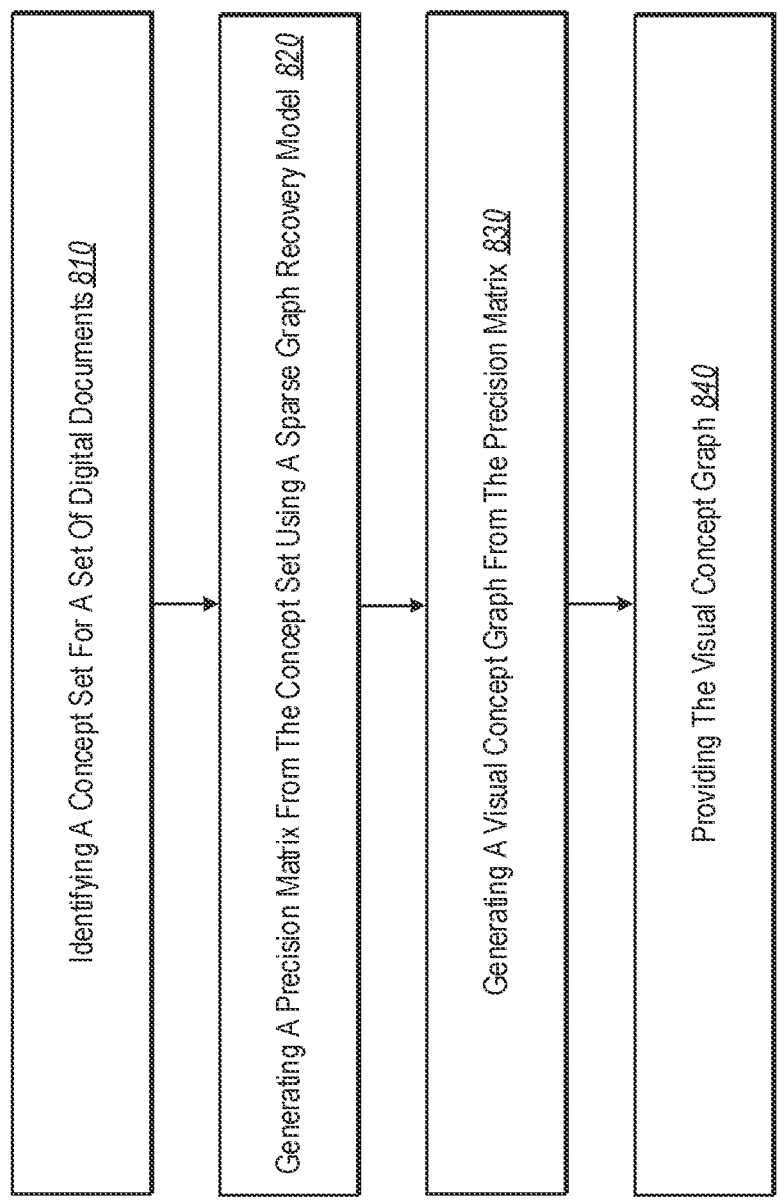
FIG. 8 illustrates example series of acts for determining and generating concept-to-concept visual graphs in accordance with one or more implementations.

Turning now to FIG. 8, this figure illustrates example flowcharts including a series of acts 800 for utilizing the concept graphing system 106 in accordance with one or more implementations. While FIG. 8 illustrates acts according to one or more implementations, alternative implementations may omit, add to, reorder, and/or modify any of the acts shown. Further, the acts of FIG. 8 can be performed as part of a method. Alternatively, a non-transitory computer-readable medium can include instructions that, when executed by one or more processors, cause a computing device to perform the acts of FIG. 8. In still further implementations, a system can perform the acts of FIG. 8.

For example, FIG. 8 illustrates a series of acts 800 for determining and generating concept-to-concept visual graphs in accordance with one or more implementations. As shown, the series of acts 800 includes an act 810 of identifying a concept set for a set of digital documents. For instance, the act 810 may involve identifying a concept set comprising one or more concept terms from a set of digital documents. In some implementations, the act 810 includes generating a document-concept matrix that includes correlations between each document in the set of digital documents and concept count values for a set of concepts found within the set of digital documents. In one or more implementations, the act 810 includes generating the set of concepts utilizing a domain-specific deep named entity recognition model with the set of digital documents to identify domain-specific concepts corresponding to the set of digital documents, wherein the one or more concept terms are a subset of the set of concepts.

In various implementations, the act 810 includes accessing the document-concept matrix from storage before receiving the concept set, receiving an additional digital document in connection with the concept set, and supplementing the document-concept matrix with the additional digital document and corresponding concept count values in real time. In one or more implementations, the act 810 includes generating a concept set including a subset of terms extracted from the set of digital documents. In some implementations, the concept set includes multiple concept terms, the visual concept graph includes concept nodes for each of the multiple concept terms, and/or a first concept node and a second concept node of the concept nodes are connected by an edge that indicates a connection strength between the first concept node and the second concept node.

In some implementations, the request for the concept graph corresponding to the set of digital documents does not include any concepts. In these implementations, the act 810 can include generating the concept set including identifying a subset of terms from the set of digital documents utilizing statistical modeling.

As further shown, the series of acts 800 includes an act 820 of generating a precision matrix from the concept set utilizing a sparse graph recovery model. For example, the act 820 may involve generating a precision matrix from the concept set and the set of digital documents utilizing a sparse graph recovery machine-learning model that determines correlation strengths between pairs of concepts within sets of digital documents. In some implementations, the act 820 includes generating a precision matrix from the concept set utilizing a sparse graph recovery machine-learning model that determines correlation strengths between pairs of concepts utilized within a document corpus. According to some implementations, the act 820 includes utilizing the sparse graph recovery machine-learning model based on the concept set and the document-concept matrix to generate the precision matrix.

In various implementations, the concept set includes a single concept. In these implementations, the act 820 can include generating an additional precision matrix from the single concept utilizing the sparse graph recovery machine-learning model, generating an additional visual concept graph based on the additional precision matrix, and updating the concept set to include a set of concept terms included in the additional visual concept graph and related to the single concept. In some implementations, generating the precision matrix includes utilizing the sparse graph recovery machine-learning model with the concept set and a document-concept matrix corresponding to the set of digital documents. In various implementations, generating the additional precision matrix includes utilizing the sparse graph recovery machine-learning model with the single concept and the document-concept matrix.

In example implementations, the concept set includes multiple concept terms. In these implementations, the visual concept graph includes concept nodes for each of the multiple concept terms. In some implementations, the sparse graph recovery machine-learning model converts a document-concept matrix into a fully interpretable precision matrix including concept-to-concept relationship indications. In various implementations, the sparse graph recovery machine-learning model includes a uGLAD model that solves a graphical least absolute shrinkage and selection operator (LASSO) problem.

As further shown, the series of acts 800 includes an act 830 of generating a visual concept graph from the precision matrix. For example, the act 830 may include generating a visual concept graph that comprises visual connections between concepts in the precision matrix accompanied by indications of connection strengths. In some implementations, the visual concept graph includes concept nodes representing the concept set interconnected by connection strength edges representing connection strengths between connected concept nodes and connection strength magnitudes that visually represent magnitudes of connection strength between connected concept nodes.

In one or more implementations, the visual concept graph includes a positive connection strength edge connecting a first concept node to a second concept node and indicating that a first concept corresponding to the first concept node appears in digital documents in which a second concept corresponding to the second concept node appears and/or a negative connection strength edge connecting a third concept node to a fourth concept node and indicating that a third concept corresponding to the third concept node does not appear in digital documents in which a fourth concept corresponding to the fourth concept node appears. In some implementations, a first concept node and a second concept node of the concept nodes are connected by a connection strength edge that indicates a connection strength between the first concept node and the second concept node.

In example implementations, the visual concept graph includes concept nodes for each of the multiple concept terms. In one or more implementations, a first concept node and a second concept node of the concept nodes are connected by a connection strength edge that indicates a connection strength between the first concept node and the second concept node.

As further shown, the series of acts 800 includes an act 840 of providing the visual concept graph. For example, the act 840 may involve providing the visual concept graph in response to receiving the concept set. In one or more implementations, the act 840 includes providing the visual concept graph in response to receiving a request for the concept graph. In some implementations, the act 840 includes displaying the visual concept graph in connection with an interactive interface on a client device. In various implementations, the interactive interface is used to facilitate a request for the visual concept graph.

In some implementations, the series of acts 800 includes additional acts. For example, in certain implementations, the series of acts includes identifying a first concept set including one concept term; generating a first precision matrix from the one concept term utilizing a sparse graph recovery machine-learning model that determines correlation strengths between pairs of concepts utilized within a document corpus; based on the first precision matrix, generating a second concept set including a set of concept terms that are related to the one concept term; generating a second precision matrix from the second concept set utilizing the sparse graph recovery machine-learning model; generating a visual concept graph that includes visual connections between concepts in the second precision matrix accompanied by indications of connection strengths; and providing the visual concept graph in response to receiving the first concept set.

In some implementations, the series of acts 800 also includes generating an additional visual concept graph that includes concept nodes corresponding to the second concept set. In various implementations, the visual concept graph includes a negative connection strength edge connecting a first concept node to a second concept node and indicating that a first concept corresponding to the first concept node does not appear in digital documents in which a second concept corresponding to the second concept node appears.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the concept graphing system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 9:
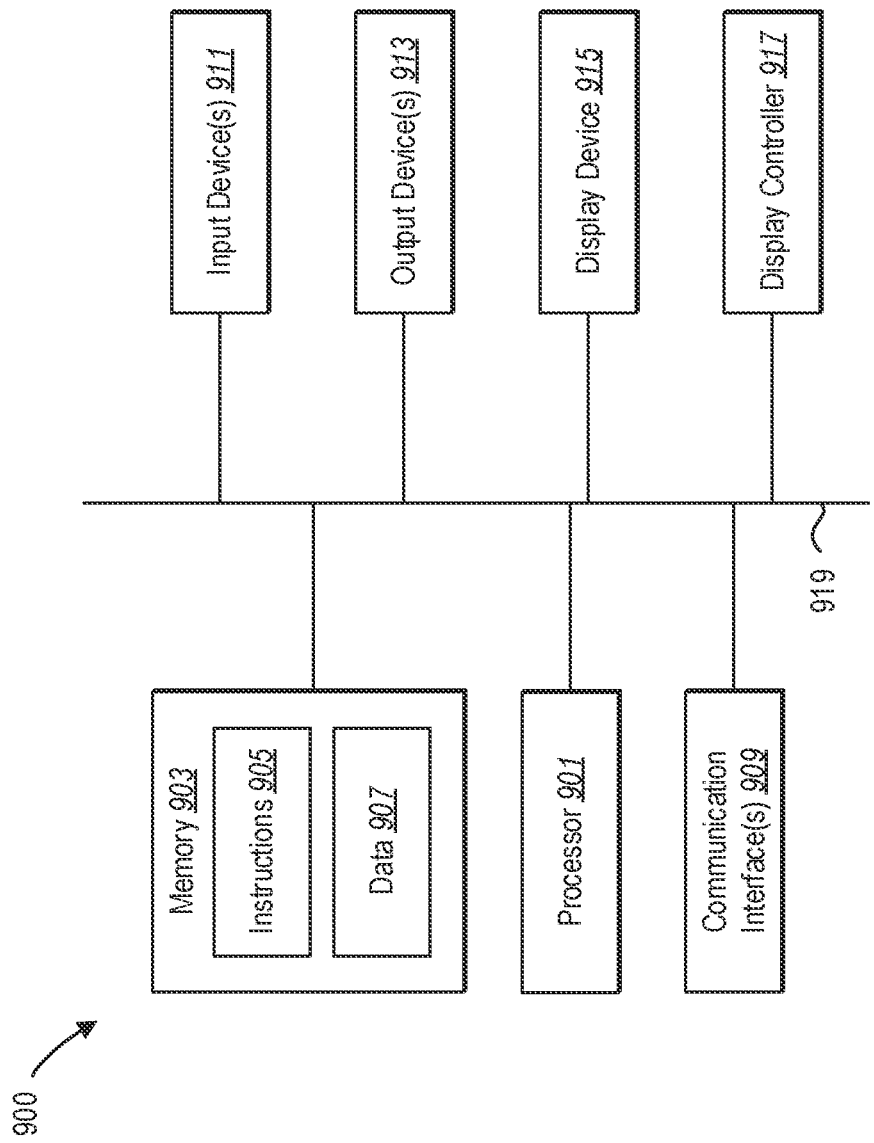
FIG. 9 illustrates certain components that may be included within a computer system.

FIG. 9 illustrates certain components that may be included within a computer system 900. The computer system 900 may be used to implement the various computing devices, components, and systems described herein.

In various implementations, the computer system 900 may represent one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processor 901. The processor 901 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates in accordance with an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method for generating concept-to-concept visual graphs, comprising:
identifying a concept set comprising one or more concept terms from a set of digital documents;
generating a precision matrix from the concept set and the set of digital documents utilizing a sparse graph recovery machine-learning model that determines correlation strengths between pairs of concepts within sets of digital documents;
generating a visual concept graph that comprises visual connections between the pairs of concepts included in the precision matrix having at least a threshold connection strength, wherein concepts are represented as nodes and the visual connections between connected nodes are represented as edges that indicate connection strengths between connected concept nodes; and
providing the visual concept graph in response to receiving the concept set.

2. The computer-implemented method of claim 1, further comprising generating a document-concept matrix having correlations between each document in the set of digital documents and concept count values for a set of concepts found within the set of digital documents.

3. The computer-implemented method of claim 2, wherein generating the precision matrix comprises utilizing the sparse graph recovery machine-learning model based on the concept set and the document-concept matrix to generate the precision matrix.

4. The computer-implemented method of claim 2, further comprising generating the set of concepts utilizing a domain-specific deep named entity recognition model with the set of digital documents to identify domain-specific concepts corresponding to the set of digital documents, wherein the one or more concept terms are a subset of the set of concepts.

5. The computer-implemented method of claim 2, further comprising:
accessing the document-concept matrix from storage before receiving the concept set;
receiving an additional digital document in connection with the concept set; and
supplementing the document-concept matrix with the additional digital document and corresponding concept count values in real time.

6. The computer-implemented method of claim 1, wherein:
the concept set comprises multiple concept terms;
the visual concept graph includes concept nodes for each of the multiple concept terms; and
a first concept node and a second concept node of the concept nodes are connected by an edge that indicates a connection strength between the first concept node and the second concept node.

7. The computer-implemented method of claim 1, wherein the concept set comprises a single concept, and the computer-implemented method further comprising:
generating an additional precision matrix from the single concept utilizing the sparse graph recovery machine-learning model;
generating an additional visual concept graph based on the additional precision matrix; and
updating the concept set to comprise a set of concept terms included in the additional visual concept graph and related to the single concept.

8. The computer-implemented method of claim 7, wherein:
generating the precision matrix comprises utilizing the sparse graph recovery machine-learning model with the concept set and a document-concept matrix corresponding to the set of digital documents; and
generating the additional precision matrix comprises utilizing the sparse graph recovery machine-learning model with the single concept and the document-concept matrix.

9. The computer-implemented method of claim 1, wherein the visual concept graph comprises concept nodes representing the concept set connected by connection strength edges that visually indicate connection strength magnitudes between connected concept nodes, wherein the connection strength magnitudes visually represent magnitudes of connection strength between connected concept nodes.

10. The computer-implemented method of claim 1, wherein the visual concept graph comprises:
a positive connection strength edge connecting a first concept node to a second concept node and indicating that a first concept corresponding to the first concept node appears in digital documents in which a second concept corresponding to the second concept node appears; and
a negative connection strength edge connecting a third concept node to a fourth concept node and indicating that a third concept corresponding to the third concept node does not appear in digital documents in which a fourth concept corresponding to the fourth concept node appears.

11. The computer-implemented method of claim 1, wherein the sparse graph recovery machine-learning model converts a document-concept matrix into a fully interpretable precision matrix comprising concept-to-concept relationship indications.

12. The computer-implemented method of claim 1, wherein the sparse graph recovery machine-learning model comprises a uGLAD model that solves a graphical least absolute shrinkage and selection operator (LASSO) problem.

13. A system comprising:
at least one processor; and
a non-transitory computer memory comprising instructions that, when executed by the at least one processor, cause the system to:
identify a request for a concept graph corresponding to a set of digital documents;
generate a concept set comprising a subset of terms extracted from the set of digital documents;
generate a precision matrix from the concept set utilizing a sparse graph recovery machine-learning model that determines correlation strengths between pairs of connected concepts utilized within a document corpus;
generate a visual concept graph that comprises visual connections between the pairs of connected concepts included in the precision matrix, wherein concepts are represented as nodes and the visual connections between connected nodes are represented as edges that indicate connection strengths between connected concept nodes; and providing the visual concept graph in response to receiving a request for the concept graph.

14. The system of claim 13, wherein:
the request for the concept graph corresponding to the set of digital documents does not include any concepts; and
generating the concept set comprising identifying a subset of terms from the set of digital documents utilizing statistical modeling.

15. The system of claim 13, wherein:
the concept set comprises multiple concept terms;
the visual concept graph includes concept nodes for each of the multiple concept terms; and
a first concept node and a second concept node of the concept nodes are connected by a connection strength edge that indicates a connection strength between the first concept node and the second concept node.

16. The system of claim 15, wherein the connection strength edge indicates a negative connection strength between the first concept node and the second concept node.

17. The system of claim 13, further comprising instructions that, when executed by the at least one processor, cause the system to generate a document-concept matrix comprising correlations between each document in the set of digital documents and concept count values for a set of concepts found within the set of digital documents.

18. A computer-implemented method for generating concept-to-concept graphs, comprising:
identifying a first concept set comprising one concept term;
generating a first precision matrix from the one concept term utilizing a sparse graph recovery machine-learning model that determines correlation strengths between pairs of concepts utilized within a document corpus;
based on the first precision matrix, generating a second concept set comprising a set of concept terms that are related to the one concept term;
generating a second precision matrix from the second concept set utilizing the sparse graph recovery machine-learning model;
generating a visual concept graph that comprises visual connections between concepts in the second precision matrix, wherein the concepts are represented as nodes and the visual connections are represented as edges indicating connection strengths; and
providing the visual concept graph in response to receiving the first concept set.

19. The computer-implemented method of claim 18, further comprising generating an additional visual concept graph that comprises concept nodes corresponding to the second concept set.

20. The computer-implemented method of claim 18, wherein the visual concept graph comprises a negative connection strength edge connecting a first concept node to a second concept node and indicating that a first concept corresponding to the first concept node does not appear in digital documents in which a second concept corresponding to the second concept node appears.

* * * * *